United States Patent
Mizutani

(10) Patent No.: US 10,609,252 B2
(45) Date of Patent: Mar. 31, 2020

(54) IMAGE FORMING DEVICE AND METHOD OF INTERPOLATION OF MISSING IMAGE DOTS

(71) Applicant: Konica Minolta, Inc., Chiyoda-ku, Tokyo (JP)

(72) Inventor: Toshiyuki Mizutani, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/174,964

(22) Filed: Oct. 30, 2018

(65) Prior Publication Data

US 2019/0132478 A1 May 2, 2019

(30) Foreign Application Priority Data

Nov. 1, 2017 (JP) .................. 2017-211459

(51) Int. Cl.
| | |
|---|---|
| *G06K 15/10* | (2006.01) |
| *H04N 1/409* | (2006.01) |
| *B41J 2/21* | (2006.01) |
| *H04N 1/405* | (2006.01) |
| *B41J 25/00* | (2006.01) |

(52) U.S. Cl.
CPC ............ *H04N 1/409* (2013.01); *B41J 2/2139* (2013.01); *B41J 2/2146* (2013.01); *H04N 1/4051* (2013.01); *H04N 1/4052* (2013.01); *B41J 2025/008* (2013.01)

(58) Field of Classification Search
None
See application file for complete search history.

(56) References Cited

U.S. PATENT DOCUMENTS

| | | | | |
|---|---|---|---|---|
| 7,265,770 | B2 * | 9/2007 | Faken | B41J 2/2139 347/171 |
| 7,338,144 | B2 * | 3/2008 | Mantell | B41J 2/2139 347/19 |
| 2005/0122366 | A1 * | 6/2005 | Nagamura | B41J 29/393 347/19 |
| 2005/0259296 | A1 * | 11/2005 | Faken | B41J 2/2139 358/3.04 |
| 2006/0284916 | A1 * | 12/2006 | Heiles | B41J 2/2139 347/19 |
| 2006/0291745 | A1 * | 12/2006 | Kang | B41J 2/2139 382/275 |

(Continued)

FOREIGN PATENT DOCUMENTS

JP 2004202795 A 7/2004

*Primary Examiner* — Dung D Tran
(74) *Attorney, Agent, or Firm* — Cantor Colburn LLP

(57) ABSTRACT

An image forming device includes: a hardware processor that performs halftone processing on input image data using a threshold matrix of a dither method, and that, when dot missing exists in a formed image by the image forming part, performs interpolation by rearranging a missing dot to peripheral pixel position; and an image forming part that forms an image on a recording medium on the basis of image data after halftone processing by the halftone processing part, wherein the hardware processor, using the threshold matrix, sets a blank pixel having a high probability of being generated next when gradation is increased, as a rearrangement destination of the missing dot.

11 Claims, 18 Drawing Sheets

(56) References Cited

U.S. PATENT DOCUMENTS

| | | | |
|---|---|---|---|
| 2007/0024662 A1* | 2/2007 | Arazaki | B41J 29/393 347/19 |
| 2007/0024663 A1* | 2/2007 | Yamanobe | B41J 2/2135 347/19 |
| 2007/0153035 A1* | 7/2007 | Jung | B41J 2/155 347/9 |
| 2014/0320567 A1* | 10/2014 | Nakajima | B41J 11/002 347/19 |
| 2016/0309056 A1* | 10/2016 | Wakui | B41J 2/2139 |
| 2018/0326667 A1* | 11/2018 | Harayama | B29C 64/393 |

* cited by examiner

FIG. 5

COLUMN OF DEFECTIVE NOZZLE
↓

|   | t → |   |   |   |   |
|---|---|---|---|---|---|
| m ↓ | 1 | 2 | 3 | 4 | 5 |
| 1 | 4 | 13 | 17 | 11 | 1 |
| 2 | 7 | 2 | 6 | 9 | 19 |
| 3 | 12 | 16 | 14 | 18 | 5 |
| 4 | 10 | 15 | 3 | 8 | 20 |

FIG. 6A

INKJET MODULE 1

| SPECIFICATION NUMBER OF NOZZLES | 3552 | | | |
|---|---|---|---|---|
| NOZZLE NUMBER | Y[pix*100] | M[pix*100] | C[pix*100] | K[pix*100] |
| 0 | 2 | 6 | 66 | 94 |
| 1 | 35 | 53 | 32 | 46 |
| 2 | 43 | 19 | 80 | 45 |
| 3 | 90 | 67 | 67 | 98 |
| 4 | 60 | 42 | 39 | 61 |
| 5 | 49 | 11 | 61 | 64 |
| 6 | 82 | 89 | 12 | 6 |
| 7 | 95 | 22 | 44 | 97 |
| 8 | 2 | 105 | 83 | 57 |
| 9 | 36 | 2 | 76 | 37 |
| 10 | 58 | 98 | 72 | 57 |
| 11 | 29 | 73 | 87 | 99 |
| 12 | 24 | 101 | 88 | 46 |
| 13 | 72 | 73 | 28 | 85 |
| 14 | 27 | 69 | 75 | 101 |
| 15 | 50 | 94 | 72 | 31 |
| 16 | 91 | 69 | 24 | 11 |
| 17 | 13 | 66 | 46 | 68 |
| 18 | 37 | 24 | 21 | 76 |
| 19 | 55 | 38 | 88 | 70 |
| 20 | 20 | 1 | 22 | 96 |
| 21 | 44 | 93 | 85 | 100 |
| 22 | 71 | 61 | 92 | 64 |
| 23 | 85 | 6 | 88 | 67 |
| 24 | 77 | 57 | 59 | 92 |
| 25 | 21 | 89 | 33 | 67 |
| 26 | 25 | 20 | 61 | 96 |
| 27 | 70 | 4 | 96 | 23 |

INKJET MODULE 2

| SPECIFICATION NUMBER OF NOZZLES | 3552 | | | |
|---|---|---|---|---|
| NOZZLE NUMBER | Y[pix*100] | M[pix*100] | C[pix*100] | K[pix*100] |
| 0 | 3 | 31 | 81 | 42 |
| 1 | 13 | 78 | 59 | 97 |
| 2 | 84 | 86 | 62 | 20 |
| 3 | 58 | 98 | 93 | 76 |
| 4 | 92 | 87 | 75 | 14 |
| 5 | 53 | 76 | 24 | 83 |
| 6 | 69 | 61 | 15 | 20 |
| 7 | 105 | 62 | 95 | 42 |
| 8 | 54 | 30 | 93 | 45 |
| 9 | 35 | 3 | 77 | 65 |
| 10 | 29 | 14 | 61 | 46 |
| 11 | 26 | 46 | 69 | 47 |
| 12 | 48 | 93 | 40 | 47 |
| 13 | 5 | 87 | 95 | 28 |
| 14 | 84 | 20 | 54 | 96 |
| 15 | 7 | 62 | 57 | 35 |
| 16 | 22 | 37 | 30 | 55 |
| 17 | 58 | 28 | 78 | 13 |
| 18 | 66 | 0 | 86 | 60 |
| 19 | 15 | 84 | 96 | 11 |
| 20 | 84 | 75 | 17 | 86 |
| 21 | 98 | 0 | 87 | 67 |
| 22 | 34 | 80 | 19 | 15 |
| 23 | 63 | 99 | 13 | 8 |
| 24 | 95 | 5 | 39 | 90 |
| 25 | 1 | 62 | 6 | 79 |
| 26 | 3 | 11 | 82 | 58 |
| 27 | 33 | 65 | 74 | 102 |

FIG. 6B

| SPECIFICATION NUMBER OF NOZZLES | 28416 |
|---|---|
| NOZZLE NUMBER | Y[pix*100] |
| 0 | 38 |
| 1 | 13 |
| 2 | 41 |
| 3 | 30 |
| 4 | 49 |
| 5 | 52 |
| 6 | 2 |
| 7 | 103 |
| 8 | 98 |
| 9 | 80 |
| 10 | 58 |
| 11 | 77 |
| 12 | 4 |
| 13 | 16 |
| 14 | 81 |
| ... | ... |
| 28411 | 69 |
| 28412 | 45 |
| 28413 | 104 |
| 28414 | 36 |
| 28415 | 75 |
| 28416 | 53 |

| SPECIFICATION NUMBER OF NOZZLES | 28416 |
|---|---|
| NOZZLE NUMBER | M[pix*100] |
| 0 | 17 |
| 1 | 28 |
| 2 | 10 |
| 3 | 41 |
| 4 | 28 |
| 5 | 17 |
| 6 | 22 |
| 7 | 64 |
| 8 | 21 |
| 9 | 79 |
| 10 | 10 |
| 11 | 35 |
| 12 | 86 |
| 13 | 23 |
| 14 | 24 |
| ... | ... |
| 28411 | 4 |
| 28412 | 77 |
| 28413 | 67 |
| 28414 | 65 |
| 28415 | 14 |
| 28416 | 80 |

| SPECIFICATION NUMBER OF NOZZLES | 28416 |
|---|---|
| NOZZLE NUMBER | C[pix*100] |
| 0 | 26 |
| 1 | 35 |
| 2 | 89 |
| 3 | 12 |
| 4 | 15 |
| 5 | 3 |
| 6 | 13 |
| 7 | 99 |
| 8 | 60 |
| 9 | 17 |
| 10 | 74 |
| 11 | 99 |
| 12 | 43 |
| 13 | 77 |
| 14 | 51 |
| ... | ... |
| 28411 | 88 |
| 28412 | 102 |
| 28413 | 61 |
| 28414 | 15 |
| 28415 | 61 |
| 28416 | 58 |

| SPECIFICATION NUMBER OF NOZZLES | 28416 |
|---|---|
| NOZZLE NUMBER | K[pix*100] |
| 0 | 29 |
| 1 | 23 |
| 2 | 56 |
| 3 | 61 |
| 4 | 91 |
| 5 | 30 |
| 6 | 87 |
| 7 | 8 |
| 8 | 74 |
| 9 | 78 |
| 10 | 26 |
| 11 | 54 |
| 12 | 90 |
| 13 | 66 |
| 14 | 26 |
| ... | ... |
| 28411 | 28 |
| 28412 | 95 |
| 28413 | 35 |
| 28414 | 18 |
| 28415 | 100 |
| 28416 | 59 |

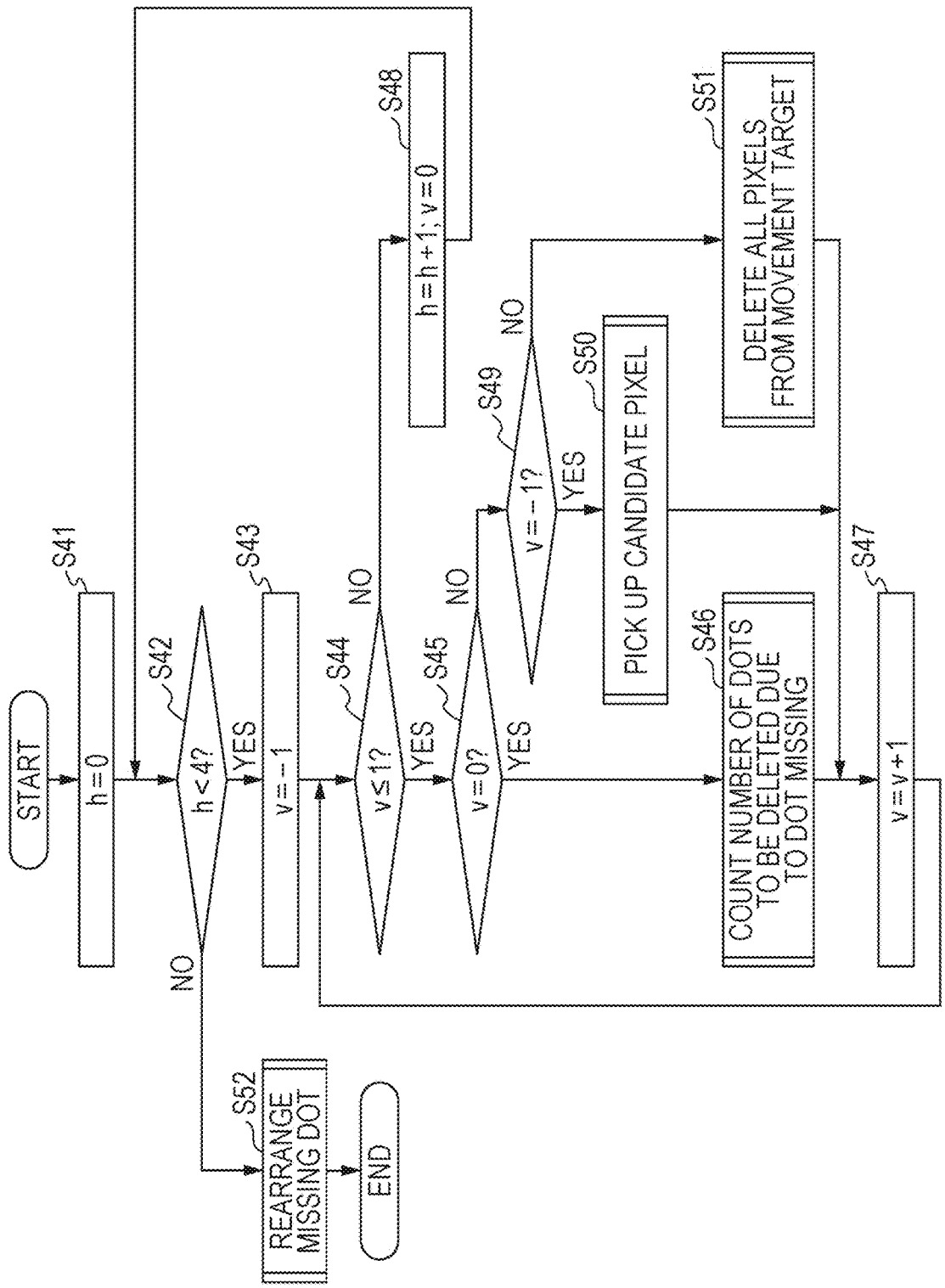

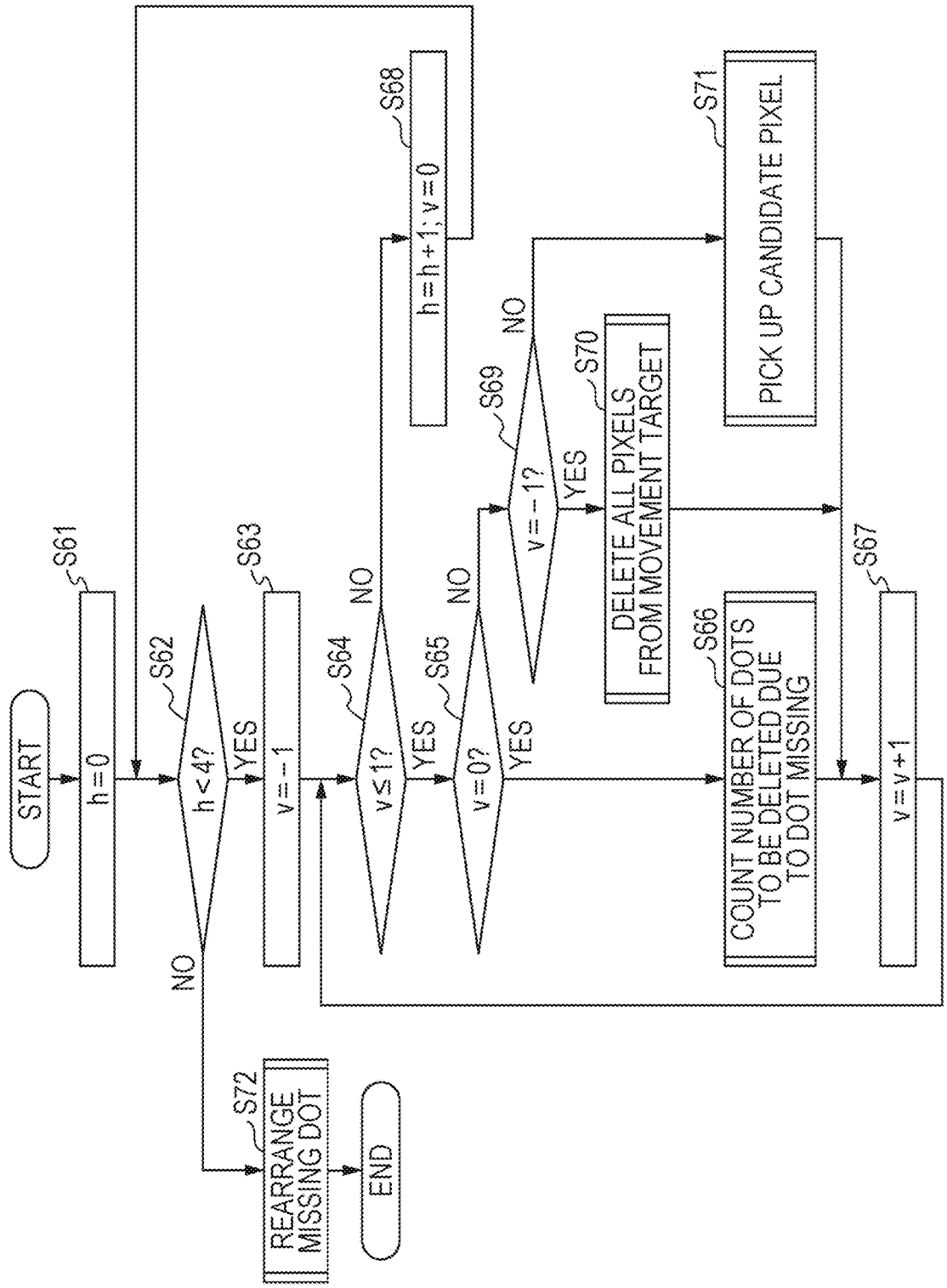

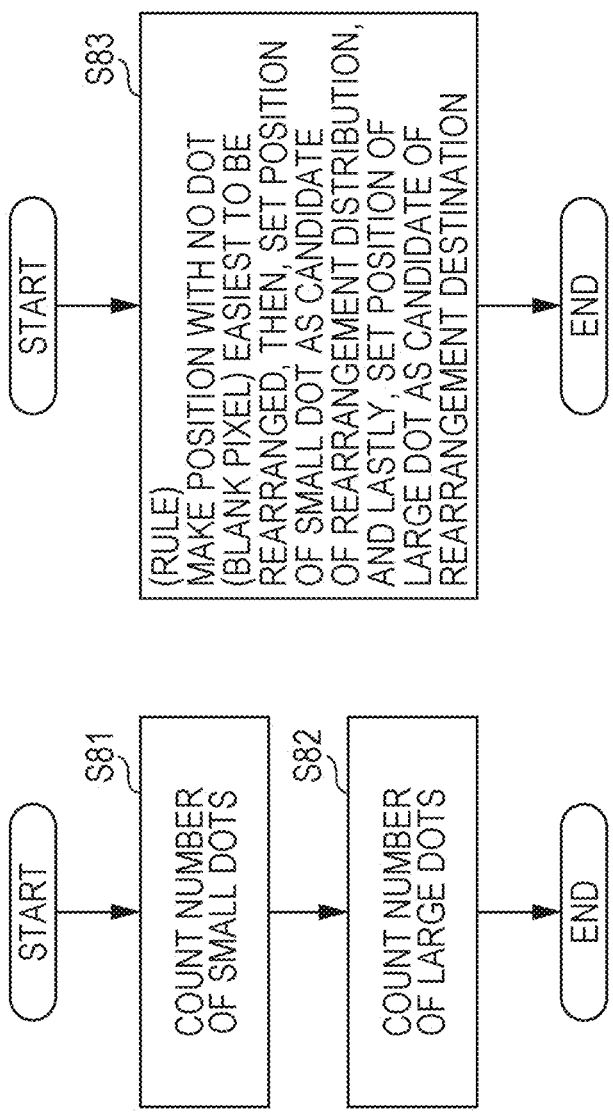

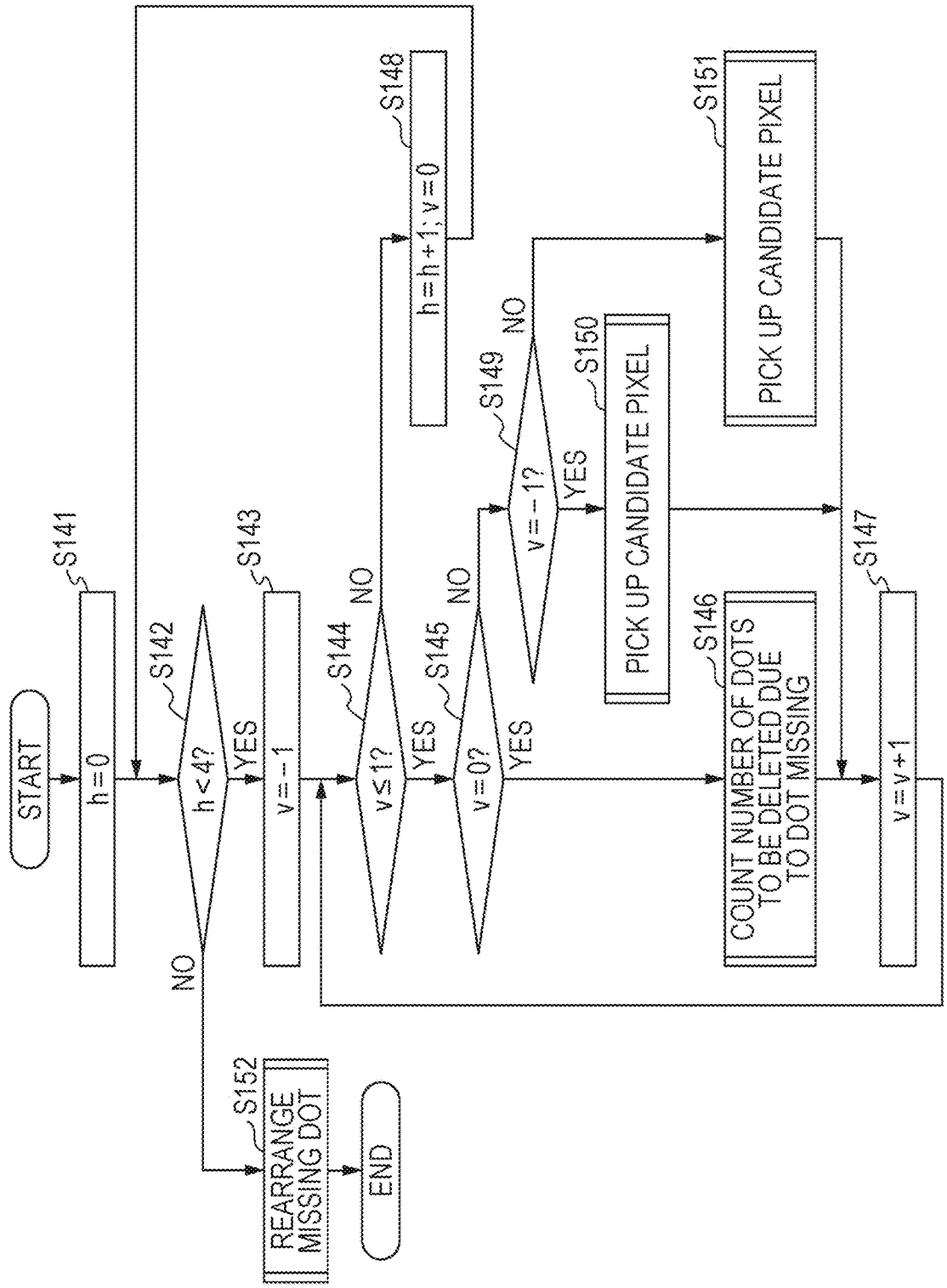

IMAGE FORMING DEVICE AND METHOD OF INTERPOLATION OF MISSING IMAGE DOTS

CROSS REFERENCE TO RELATED APPLICATIONS

The present application claims priority under 35 U.S.C. § 119 to Japanese patent Application No. 2017-211459, filed on Nov. 1, 2017, the entire content of which is incorporated herein by reference.

BACKGROUND

Technological Field

The present invention relates to an image forming device, an image processing device, and an image processing method.

Description of the Related Art

As an example of an image forming device, there is an inkjet type image forming device (hereinafter referred to as "inkjet recording device") that causes a plurality of nozzles to discharge (eject) ink droplets, and lands the ink droplets on a recording medium such as a sheet, to form an image. In this inkjet recording device, due to influences of mist generated at the time of discharging of the ink droplets, air flowing from the upstream side of an ink supply flow path, viscosity of the ink, or the like, a nozzle may be clogged so that the nozzle cannot discharge the ink droplets, or a landing position of the discharged ink droplets may be deviated in some cases.

Discharge failure of the ink droplets of the nozzle causes deterioration in image quality of an image formed on a recording medium (hereinafter, sometimes described as "formed image"). As an example, when the nozzle is clogged and the ink droplets cannot be discharged, missing of dots occurs, so that a white streaky image defect occurs along a conveyance direction of the recording medium on the formed image. Therefore, conventionally, a normal dither matrix and a non-discharging dither matrix are provided, a dither matrix is selectively applied on the basis of position information of a non-discharging nozzle, and interpolation of a dot being missing is performed on the basis of a fixed halftone pattern (for example, see JP 2004-202795 A).

When interpolation of dots being missing (hereinafter, sometimes described as a "missing dot") is performed by using a fixed halftone pattern to move the missing dots to peripheral pixel positions as the rearrangement destinations, glossy feeling may vary even though the density of the image formed on the recording medium is entirely the same depending on the rearrangement destination of the missing dot. Particularly, in the case of performing image formation using ink, in which ink droplets are solidified on a recording medium and fixed on the recording medium, such as UV curable ink or phase change ink, the graininess difference and the difference in gloss between an interpolation part and a non-interpolation part become conspicuous (details will be described later) due to interference with an original halftone pattern of missing dots of a movement destination, coalesce of ink droplets, or the like.

SUMMARY

It is therefore an object of the present invention to provide an image forming device, an image processing device, and an image processing method capable of suppressing deterioration in image quality due to discomfort of gloss when performing interpolation by rearranging missing dots to peripheral pixel positions.

To achieve the abovementioned object, according to an aspect of the present invention, an image forming device reflecting one aspect of the present invention comprises: a hardware processor that performs halftone processing on input image data using a threshold matrix of a dither method, and that, when dot missing exists in a formed image by the image forming part, performs interpolation by rearranging a missing dot to peripheral pixel position; and an image forming part that forms an image on a recording medium on the basis of image data after halftone processing by the halftone processing part, wherein the hardware processor, using the threshold matrix, sets a blank pixel having a high probability of being generated next when gradation is increased, as a rearrangement destination of the missing dot.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram showing an example of a threshold matrix used for halftone processing;

FIG. 6A and FIG. 6B are diagrams showing an example of correction data used for correction processing of missing dots;

FIG. 11 is a flowchart showing a flow of processing according to a second embodiment (that is, processing of distributing rearrangement destinations of the missing dots to an adjacent pixel row on the other side of a pixel row of interest in the case of dot missing in successive two pixels);

FIG. 12 is a flowchart showing a flow of processing according to a third embodiment (that is, processing of distributing rearrangement destinations of the missing dots to an adjacent pixel row on one side of the pixel row of interest in the case of dot missing in successive two pixels);

FIG. 13A to FIG. 13C are flowcharts showing a flow of processing according to a fourth embodiment (that is, processing A for counting the number of missing dots determined not to be formed by a defective nozzle in a pixel row corresponding to the defective nozzle, processing B for picking up candidate pixels of the rearrangement destinations of the missing dot, and processing C of deleting all pixels from movement targets of the missing dots);

FIG. 17 is a flowchart showing a flow of processing according to an eighth embodiment (that is, processing of distributing rearrangement destinations of missing dots equally to two adjacent pixel rows in the case of dot missing in one pixel).

DETAILED DESCRIPTION OF EMBODIMENTS

Figure 1:
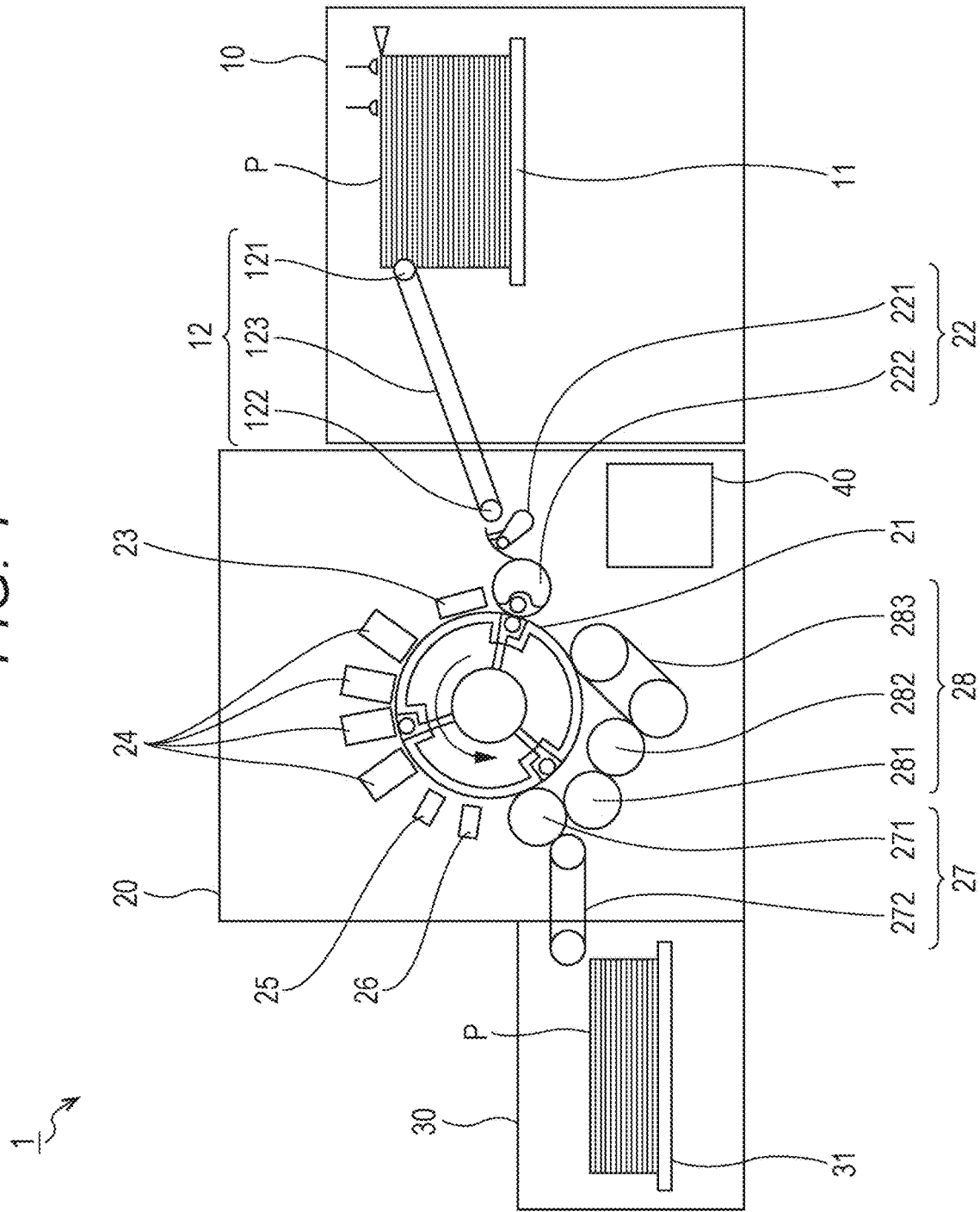
FIG. 1 is a schematic configuration diagram showing the overall configuration of an inkjet recording device according to an embodiment of the present invention.

Hereinafter, one or more embodiments of the present invention will be described with reference to the drawings. However, the scope of the invention is not limited to the disclosed embodiments. In the following description and drawings, the same reference numerals will be used for the same elements or elements having the same function, and redundant description will be omitted.

<Configuration Example of Inkjet Recording Device>

In the present embodiment, an inkjet recording device (an inkjet type image forming device) will be described as an example of an image forming device. A configuration example of the inkjet recording device will be described with reference to FIG. 1. FIG. 1 is a schematic configuration diagram showing the overall configuration of the inkjet recording device according to an embodiment of the present invention.

An inkjet recording device 1 shown in FIG. 1 is an image forming device that forms an image on a sheet P, which is an example of a recording medium, by discharging (ejecting) ink droplets from a nozzle provided in an inkjet head. The inkjet recording device 1 is a color inkjet recording device that superimposes inks of four colors of yellow (Y), magenta (M), cyan (C), and black (K).

The inkjet recording device 1 includes a sheet feed part 10, an image forming part 20, a sheet discharge part 30, and a control part 40. Then, the inkjet recording device 1 forms (records) an image based on image data input from an external device 2 (see FIG. 3) on the sheet P.

The sheet feed part 10 includes a sheet feed tray 11 and a sheet supply part 12. The sheet feed tray 11 is a plate-like member provided so that the sheet P can be placed thereon. The sheet feed tray 11 is provided so as to be movable in an up and down direction in accordance with the number of sheets P placed thereon. Then, among the plurality of sheets P placed on the sheet feed tray 11, the uppermost sheet P in the up and down direction is held at a position to be conveyed by the sheet feed part 12.

The sheet feed part 12 has a plurality of (two in this example) rollers 121, 122 and a conveyor belt 123. The conveyor belt 123 is formed in an endless shape in which both ends in a longitudinal direction are connected. The conveyor belt 123 is stretched around the rollers 121, 122. As one of the rollers 121, 122 is driven to rotate, the conveyor belt 123 circulates between the two rollers 121, 122. As a result, the sheet P placed on the conveyor belt 123 is conveyed.

The sheet feed part 12 has a drive part not shown for driving the rollers 121, 122 to rotate, and a feed device for delivering the uppermost sheet P placed on the sheet feed tray 11 to the conveyor belt 123. Then, the sheet feed part 12 conveys the sheet P placed on the conveyor belt 123 toward the image forming part 20, and feeds the sheet P to the image forming part 20.

The image forming part 20 has an image forming drum 21, a delivery unit 22, a heating part 23, a head unit 24, a fixing part 25, an image reading part 26, a sheet discharge part 27, and a sheet inverting part 28.

The image forming drum 21 is formed in a cylindrical shape. The image forming drum 21 rotates in the counterclockwise direction by rotation drive by a driving motor not shown. On the outer circumferential surface of the image forming drum 21, the sheet P fed from the sheet feed part 10 is carried. Then, the image forming drum 21 rotates to convey the sheet P toward the sheet discharge part 30. The heating part 23, the head unit 24, the fixing part 25, and the image reading part 26 are arranged so as to face the outer circumferential surface of the image forming drum 21.

The delivery unit 22 is provided between the sheet feed part 12 of the sheet feed part 10 and the image forming drum 21. The delivery unit 22 has a claw part 221, a cylindrical delivery drum 222, and the like. The claw part 221 carries one end of the sheet P conveyed by the sheet feed part 12. The delivery drum 222 guides the sheet P carried by the claw part 221 toward the image forming drum 21. As a result, the sheet P is delivered from the sheet feed part 12 to the outer circumferential surface of the image forming drum 21 via the delivery unit 22.

On the downstream side of the delivery drum 222 in the conveyance direction of the sheet P, the heating part 23 is arranged. The heating part 23 has, for example, a heating wire or the like, and generates heat when energized. Under the control of the control part 40, the heating part 23 performs heating such that the sheet P carried by the image forming drum 21 and passing in the vicinity of the heating part 23 has a predetermined temperature.

A temperature sensor not shown is provided in the vicinity of the heating part 23. The temperature sensor detects the temperature in the vicinity of the heating part 23. The control part 40 controls the temperature of the heating part 23 on the basis of temperature information detected by the temperature sensor.

A head unit 24 is provided on the downstream side of the heating part 23 in the conveyance direction of the sheet P. Four head units 24 are provided corresponding to colors of yellow (Y), magenta (M), cyan (C), and black (K), respectively. The four head units 24 are arranged in order of yellow, magenta, cyan, and black from the upstream side with respect to the conveyance direction of the sheet P.

The head unit 24 is set to a length (page width) that covers the entirety of the sheet P in a direction orthogonal to the conveyance direction of the sheet P (the width direction of the sheet P). That is, the inkjet recording device 1 according to this example is a one-pass method line head type inkjet recording device that forms an image by causing the head unit 24 to scan the sheet P only once. The four head units 24 have the same configuration except that the colors of the inks to be discharged are different from each other. Details of the head unit 24 will be described later.

A fixing part 25 is arranged on the downstream side of the four head units 24 in the conveyance direction of the sheet P. As the fixing part 25, for example, a fluorescent tube that emits ultraviolet rays such as a low-pressure mercury lamp is applied. The fixing part 25 irradiates the sheet P that has been conveyed by the image forming drum 21 with ultraviolet rays, and cures the ink droplets discharged onto the sheet P. As a result, the fixing part 25 fixes the image formed on the sheet P.

As a fluorescent tube emitting ultraviolet rays, in addition to a low-pressure mercury lamp, a mercury lamp having an operating pressure of about several hundreds Pa to 1 MPa, a light source usable as a sterilizing lamp, a cold cathode tube, an ultraviolet laser light source, a metal halide lamp, a light emitting diode, and the like can be exemplified. Among them, a light source that can emit ultraviolet rays with higher illuminance and consumes less power (for example, a light emitting diode or the like) is more desirable as the fluorescent tube.

It should be noted that the fixing part 25 is not limited to one that emits light of ultraviolet rays. The fixing part 25 may be any one that emits an energy beam having the property of curing ink according to the properties of the ink, and a light source is substituted depending on the wavelength of the energy beam or the like. As a fixing method of the fixing part, for example, various methods such as drying ink droplets by applying heat to the sheet, or applying a liquid causing a chemical change to the ink droplets can be applied.

An image reading part 26 is arranged on the downstream side of the fixing part 25 in the conveyance direction of the sheet P. The image reading part 26 is composed of an inline sensor in which a plurality of detection elements are arrayed along a direction orthogonal to the conveyance direction of the sheet P (the width direction of the sheet P), reads an image formed on the sheet P by the head unit 24 and the fixing part 25, and transmits data of the read image to the control part 40. An interval between the detection elements composing the image reading part 26 is set wider than the interval between nozzles 244 of an inkjet head 242. That is, the resolution of the image reading part 26 is set to be rougher than the resolution of the head unit 24.

A sheet discharge part 27 and a sheet inverting part 28 are provided on the downstream side of the image reading part 26 in the conveyance direction of the sheet P. The sheet discharge part 27 conveys the sheet P conveyed by the image forming drum 21 toward the sheet discharge part 30.

The sheet discharge part 27 has a cylindrical separation drum 271 and a discharge belt 272. The separation drum 271 separates the sheet P carried by the image forming drum 21, from the outer circumferential surface of the image forming drum 21. Then, the separation drum 271 guides the sheet P to the discharge belt 272 or the sheet inverting part 28.

The separation drum 271 guides the sheet P to the discharge belt 272 when face-up sheet discharge in single-side image formation is performed. Further, the separation drum 271 guides the sheet P to the sheet inverting part 28 when face-down paper discharge in single-side image formation or double-side image formation is performed.

The discharge belt 272 is formed in an endless shape as similar to the conveyor belt 123 of the sheet feed part 12. The discharge belt 272 is rotatably supported by a plurality of rollers. The discharge belt 272 sends out the delivered sheet P by the separation drum 271 to the sheet discharge part 30.

The sheet inverting part 28 has a plurality of inversion rollers 281, 282 and an inversion belt 283. When the face-down sheet discharge is performed, the sheet inverting part 28 inverts the front and back of the sheet P guided by the separation drum 271 and conveys the sheet P to the sheet discharge part 27. As a result, the sheet P is conveyed to the sheet discharge part 30 by the sheet discharge part 27 in a state in which the surface on which the sheet image is formed faces downward in the up and down direction.

When double-side image formation is performed, the sheet inverting part 28 inverts the front and back of the sheet P guided by the separation drum 271, and conveys the sheet P again to the outer circumferential surface of the image forming drum 21. As a result, the sheet P is conveyed by the image forming drum 21 and passes through the heating part 23, the head unit 24, the fixing part 25, and the image reading part 26 again.

The sheet discharge part 30 stores the sheet P sent from the image forming part 20 by the sheet discharge part 27. The sheet discharge part 30 has a flat discharge tray 31. Then, the sheet discharge part 30 places the sheet P on which the image is formed on the sheet discharge tray 31.

[Configuration Example of Head Unit]

Figure 2:
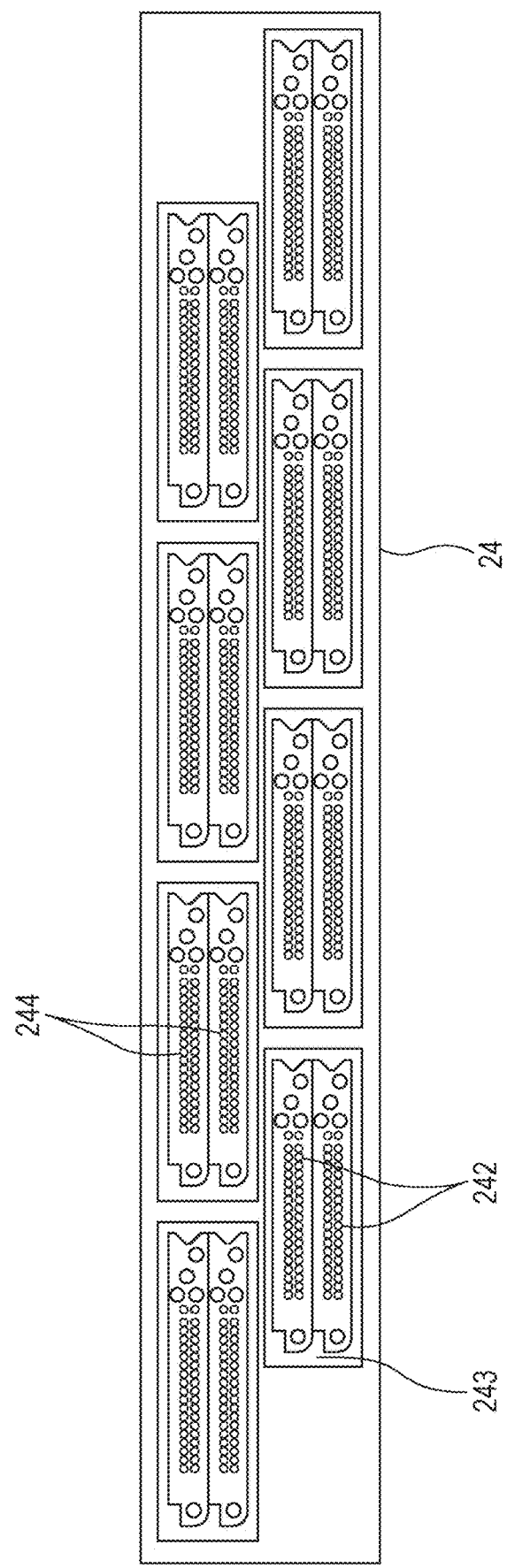
FIG. 2 is a plan view showing a state in which a head unit in the inkjet recording device according to the embodiment of the present invention is viewed from a recording medium side.

Next, a configuration example of the head unit 24 will be described with reference to FIG. 2. FIG. 2 is a plan view showing a state in which the head unit 24 in the inkjet recording device 1 according to the embodiment of the present invention is viewed from the sheet side.

As shown in FIG. 2, the head unit 24 has a plurality (sixteen in this example) of inkjet heads 242. Two inkjet heads 242 form one set to compose one inkjet module 243. Therefore, the head unit 24 of this example is provided with eight inkjet modules 243.

Two rows of the eight inkjet modules 243 are arrayed along the conveyance direction of the sheet P. Four rows of the inkjet modules 243 are arrayed and arranged along a direction (width direction) orthogonal to the conveyance direction of the sheet P. The eight inkjet modules 243 are arranged in a staggered manner such that the two rows of inkjet modules 243 are alternately along the conveyance direction of the sheet P and parts of the head end parts of the inkjet modules 243 adjacent with each other in the width direction overlap with each other in the width direction.

It should be noted that the number and arrangement of the inkjet modules 243 are not limited to the examples described above, and six or ten or more inkjet modules 243 may be arranged.

The inkjet head 242 has a plurality of nozzles 244 that discharge ink droplets toward the sheet P. In each of the inkjet heads 242, ink droplets are discharged from the nozzles 244 toward the sheet P, so that an image is formed on the sheet P carried by the image forming drum 21.

<Configuration Example of Control System>

Figure 3:
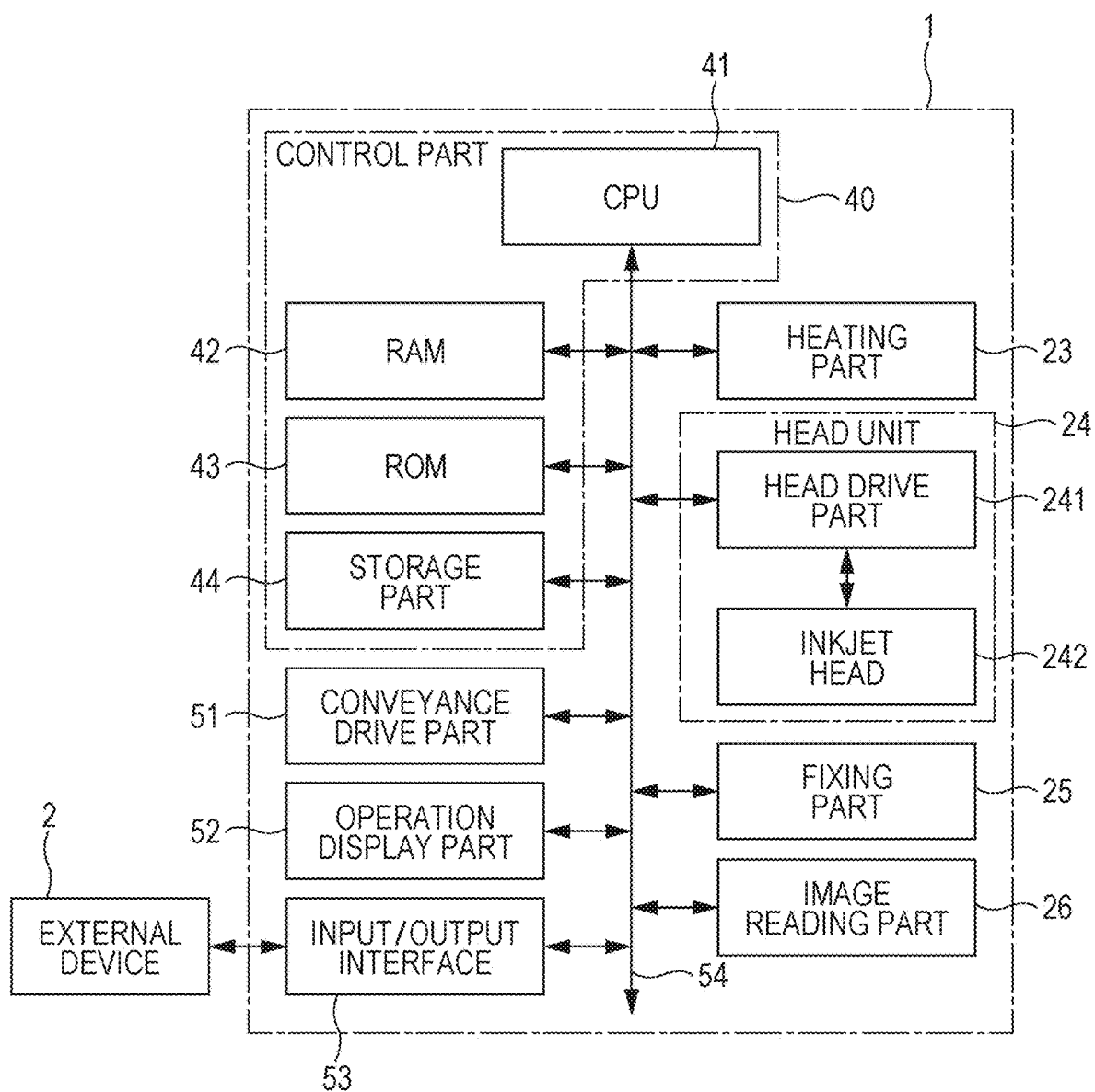
FIG. 3 is a block diagram showing a configuration of a control system of the inkjet recording device according to the embodiment of the present invention.

Next, the configuration of the control system of the inkjet recording device 1 will be described with reference to FIG. 3. FIG. 3 is a block diagram showing the configuration of the control system of the inkjet recording device 1 according to the embodiment of the present invention.

As shown in FIG. 3, the inkjet recording device 1 includes a control part 40. The control part 40 includes, for example, a central processing unit (CPU) 41, a random access memory (RAM) 42 used as a work area of the CPU 41, and a read only memory (ROM) 43 for storing programs executed by the CPU 41 or the like.

The control part 40 has a storage part 44 such as a hard disk drive (HDD) as a mass storage device. The storage part 44 stores data of images read by the image reading part 26 and information such as a threshold matrix used for halftone processing described later.

The inkjet recording device 1 has a conveyance drive part 51 that drives a conveyance system such as the image forming drum 21, the sheet discharge part 27, and the sheet inverting part 28, an operation display part 52, and an input/output interface 53.

The CPU 41 of the control part 40 is connected to the heating part 23, the head unit 24, the fixing part 25, the image reading part 26, the RAM 42, the ROM 43, and the storage part 44 via a system bus 54, and controls the entire inkjet recording device 1. The CPU 41 is connected to the conveyance drive part 51, the operation display part 52, and the input/output interface 53 via the system bus 54.

The operation display part 52 is configured by, for example, using a touch panel that combines a panel type display device such as a liquid crystal display device (LCD) or an organic electro luminescence (EL) display device and a position input device such as a touch pad. This operation display part 52 displays an instruction menu for a user, information on the acquired image data, and the like. The operation display part 52 includes a plurality of keys and serves as an input part that accepts an input of data such as various instructions, characters, or numerals by the user's key operation.

The input/output interface 53 is connected to an external device 2 such as a personal computer (PC), or a facsimile device. The input/output interface 53 receives image data from the external device 2 and outputs the received image data to the control part 40. The control part 40 performs image processing such as halftone processing on the image data input through the input/output interface 53. The control part 40 performs image processing such as shading correction, image density adjustment, or image compression on input image data as necessary.

The head unit 24 receives the image data subjected to image processing by the control part 40, and forms a predetermined image on the sheet P on the basis of the image data. Specifically, the head unit 24 drives a head drive part 241, causes the nozzles 244 of the inkjet head 242 to discharge (eject) ink droplets, and causes the ink droplets to land on a predetermined position on the sheet P, to form an image. The image formed on the sheet P by the head unit 24 is read by the image reading part 26, and image data based on the read image is sent to the control part 40.

[Image Processing Function Block of Control Part]

The control part 40 has an image processing function part that performs image processing including halftone processing performed on image data input through the input/output interface 53, specifically, image processing including the halftone processing using the dithering method. The specific image processing of this image processing function part will be described with reference to FIG. 4.

The halftone processing is processing for representing different gray densities in the image formed on the recording medium by one or more types of dots. Here, the one or more types of dots are dots having different densities per unit area, and are represented as, for example, dots having different dot diameters (large dots and small dots), or dots having different dot densities (dark dots and light dots).

Figure 4:
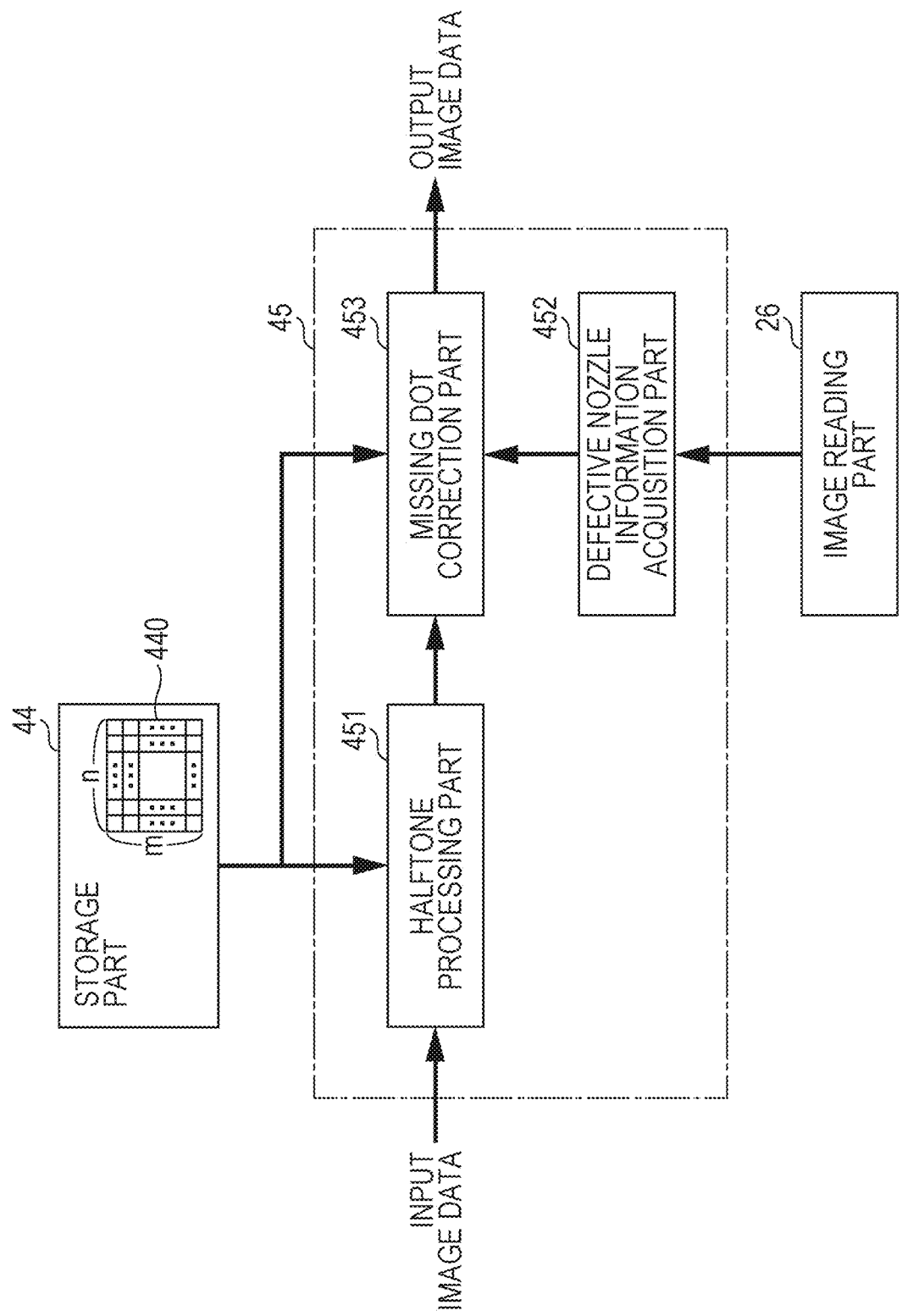
FIG. 4 is a block diagram of an image processing function part included in a control part in the control system of the inkjet recording device.

FIG. 4 is a block diagram of the image processing function part included in the control part 40 in the control system of the inkjet recording device 1. As shown in FIG. 4, the image processing function part 45 has functional parts, that is, a halftone processing part 451, a defective nozzle information acquisition part 452, and a missing dot correction part 453. The image processing function part 45 can also be referred to as a function part of the ROM 43 for storing a program executed by the CPU 41 or the like.

The image processing function part 45 composes an image processing device for applying image processing such as the halftone processing on an input image data, and inputs image data fed from the external device 2 through the input/output interface 53. The image processing function part 45 performs each function of the halftone processing part 451, the defective nozzle information acquisition part 452, and the missing dot correction part 453 under the control of the CPU 41 (see FIG. 3).

In the image processing function part 45, the halftone processing part 451 performs the halftone processing on input image data using a threshold matrix (that is, dither matrix) 440 of the dither method stored in the storage part 44. Quantized data after the halftone processing is then performed with missing dot correction processing using the missing dot correction part 453. Here, the threshold matrix 440 used for halftone processing in the halftone processing part 451 will be described.

The threshold matrix 440 is data in which a threshold is set for each pixel corresponding to a predetermined pixel region. The predetermined pixel region is, for example, an n×m (n, m are integers of two or more) pixel region of one direction along the array of pixels composing the image data (nozzle array direction/direction along the pixel column) and another direction orthogonal to the one direction (direction along the pixel row). In the threshold matrix 440, n×m thresholds are set corresponding to n×m pixels. The n×m thresholds are thresholds for determining which dot is to be formed for each pixel in the pixel region corresponding to the predetermined pixel region out of the pixel regions composing the image data.

The halftone processing part 451 uses the threshold matrix 440 having n×m thresholds and compares the grayscale level of the input image with each threshold of the threshold matrix 440 to perform quantization processing on a value having smaller number of levels than the grayscale level of the input image. After completing the quantization processing of n×m pixels, the halftone processing part 451 sequentially moves the threshold matrix 440 to the pixel region of the next n×m pixels, and repeats the quantization processing in the similar manner, to perform the halftone processing in which the dense of gray is represented by a pattern of one or more types of dots. As a specific example of the threshold matrix 440, various global threshold matrices such as a blue noise mask and a green noise mask can be applied.

The defective nozzle information acquisition part 452 compares image data input from the image reading part 26, for example, when a test chart on which the ejection state of each nozzle can be separated is printed (image formation) on the sheet P, with the original image data stored in the storage part 44, to acquire the information on the defective nozzle. Here, when a nozzle that cannot discharge ink droplets due to clogging of a nozzle, a nozzle with which the landing positions of ink droplets to be discharged are deviated, or the like is regarded as a defective nozzle, as information on the defective nozzle, information on a defective state of the defective nozzle, position information of the defective nozzle, and the like can be exemplified.

Here, the defective nozzle information acquisition part 452 detects the defective nozzle that cannot discharge ink droplets and the defective nozzle with which landing positions of ink droplets deviate, on the basis of the image data input from the image reading part 26 to acquire the information on defective nozzles. However, the acquisition method is not limited to this. For example, various methods such as a method of acquiring information on defective nozzles by directly detecting the discharge state or the like of ink droplets from the nozzles by using an optical sensor can be used.

The missing dot correction part 453 performs interpolation processing of dots being missing (missing dots) due to a defective nozzle on the image formed on the recording medium on the basis of the acquired information of the defective nozzle information acquisition part 452, so that missing of dots is made visually inconspicuous. More specifically, the missing dot correction part 453 uses the threshold matrix (dither matrix) of the dither used in the halftone processing part 451 to perform processing of moving (rearranging) the missing dots with peripheral pixel positions of the missing dots as the rearrangement destinations.

<Regarding Discomfort of Gloss of Formed Image Accompanied with Interpolation of Missing Dots>

When interpolation of the missing dots is performed by moving the missing dots to the peripheral pixel positions of the missing dots as the rearrangement destinations, glossy feeling may vary even though the density of the image formed on the recording medium is entirely the same, depending on the rearrangement destination of the missing dot. Particularly, in the case of performing three-dimensional image formation using ink, in which ink droplets are solidified on a recording medium and fixed on the recording medium, such as UV curable ink or phase change ink, the graininess feeling of dots are degraded and the discomfort of gloss become conspicuous due to interference with an original halftone pattern of missing dots of rearrangement destinations (movement destinations), coalesce of ink droplets, or the like.

More specifically, as the missing dots are interpolated, when discharge (ejection) of the ink droplets concentrates at the destinations of the missing dots and a local dot rate increases, adjacent dots coalesce with each other at the time of solidifying of the ink droplets, so that an unintended ink block is formed. The dot rate is a ratio of pixels forming dots out of a plurality of pixels composing image data that is original data of an image to be formed on the recording medium.

The gloss is recognized as spatial distribution of glossy portions of the sheet surface, glossy portions of the ink surface, and scattering portions of the edge portion. Therefore, in the unintended ink block portion, since the glossy portions of the ink surface locally increase, the discomfort of gloss is generated. As a result, even though the density of the image formed on the recording medium is globally the same, since the dot formation portion at the rearrangement destinations of the missing dots changes in gloss as compared with other dot formation portions, the discomfort is visually recognized as a glossy stripe along the conveyance direction of the sheet P. This glossy stripe causes degradation of the image quality of the image formed on the recording medium.

Therefore, in the present embodiment, in the image processing function part 45 included in the control part 40 composing the image processing device, the missing dot correction part 453 uses the threshold matrix of the dither method, and adjusts the phase spatially with the phase at the time of generation of the halftone pattern in the halftone processing part 451, to set blank pixels (pixels on which no dot is formed) having a high probability of being generated next when the gradation is increased, as the rearrangement destinations of the missing dots caused by the defective nozzle. In other words, when the missing dots are rearranged, the originally used halftone pattern is referred to, and blank pixels having a high probability of being generated next when the gradation is increased, is determined as the rearrangement destinations of the missing dots.

Figure 5:
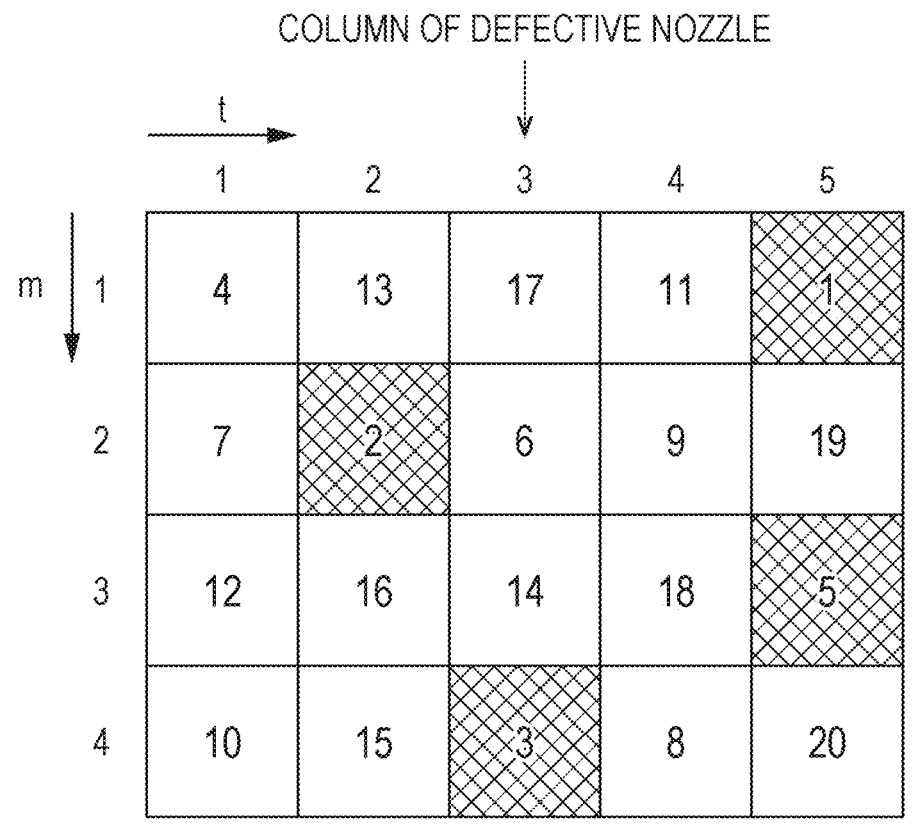

The setting of the rearrangement destinations of the missing dots will be specifically described. Here, as an example, description is given for a case where the halftone processing is performed using a threshold matrix having 5×4 thresholds as a part of the global threshold matrix as shown in FIG. 5. In the threshold matrix shown in FIG. 5, the row number of the pixel rows in the up and down direction (conveyance direction of the recording medium) in the drawing is set to m, and the column number of the pixel columns in a right and left direction (nozzle array direction) in the drawing is set to t. Here, numerical values from 1 to 20 are described as the thresholds composing the threshold matrix shown in FIG. 5. For example, when an 8-bit input image is quantized by using a threshold matrix composed of 256×256 pixels, numerical values from 0 to 255 are assigned as thresholds composing the threshold matrix. In the description of the present embodiment, for easy understanding, a 5×4 region from a part thereof is picked up, furthermore, the numerical values are sorted in order of generation of landing of dots, and therefore, numerical values from 1 to 20 are assigned.

As an example, when the image data input at all the pixel positions in the 5×4 pixel region is 25%, pixels having thresholds of "5" or less in the threshold matrix, that is, pixels having thresholds of 1, 2, 3, 4, 5 (shaded pixels in the drawing) are black. Here, a case is considered where the nozzle of the pixel row of t=3 is a defective nozzle. In this example, the pixel row of t=3 is a dot missing row, and this missing row includes a pixel with a threshold of "3", and the dot to be printed at the position of the pixel is missing. In this case, the missing dot correction part 453 performs interpolation of the missing dots by rearranging the missing dots to the pixels of the pixel rows of t=2, 4 adjacent to the pixel row of the missing dots.

At this time, in the example of the threshold matrix shown in FIG. 5, in the pixel row (t=2) and the pixel row (t=4) that are adjacent to the pixel row of the missing dots, the blank pixels having a high probability of being generated next when the gradation is increased are pixels of the threshold of "8" that is a threshold closest to the threshold of "5" (m=4, t=4 pixels). Therefore, the missing dot correction part 453 uses the threshold matrix of the dither method used for the halftone pattern, and sets the blank pixels of the threshold of "8" that is a threshold having a high probability of being generated next when the gradation is increased, as the rearrangement destinations of the missing dots to be printed at the position of the pixels of the threshold of "3".

As described above, in the present embodiment, the threshold matrix of the dither method used in the halftone pattern is used, and a phase of the threshold matrix is adjusted to the phase spatially with the phase of when the phase is applied at the time of generation of the halftone pattern in the halftone processing part 451, to set blank pixels having a high probability of being generated next when the gradation is increased, as the rearrangement destinations of the missing dots caused by the defective nozzle.

Thereby, it is possible to prevent interference of missing dots of the movement destinations (rearrangement destinations) with the original halftone pattern, prevent coalescence of ink droplets, and suppress change of graininess feeling, so that a glossy feeling close to the original halftone pattern can be realized in the image formed on the recording medium. As a result, it is possible to suppress deterioration in image quality due to the discomfort of gloss, so that it is possible to achieve both high image quality and natural glossy feeling of an image formed on a recording medium.

In the interpolation processing by the missing dot correction part 453, since the image data after the halftone processing in the halftone processing part 451 is the target to be processed, it is possible to quickly correct missing dots due to a defective nozzle. In the halftone processing in the halftone processing part 451, interpolation performance of missing dots can be improved by performing processing to create blank pixels.

Hereinafter, a specific example will be described in which, blank pixels having a high possibility of being generated next when the gradation is increased are set as rearrangement destinations of missing dots due to a defective nozzle, in the missing dot correction processing of rearranging missing dots to make the missing dots to be visually inconspicuous. In the missing dot correction processing described below, an image after quantization of gray gradation decomposed into units of 3552 nozzles, for example, is set as a target to be processed by linkage correction for preventing deterioration in image quality due to a joint between inkjet heads.

In the correction processing of the missing dots, the correction data is held in the storage part 44 (see FIG. 3). An example of correction data is shown in FIG. 6A and FIG. 6B. For example, in the correction data of FIG. 6A, the second row of the first column is the number of used nozzles (3552 in this example), and the second row is an index. Pieces of data on the deviation amount of landing positions of ink droplets from the third and subsequent rows are arrayed for the designated number of nozzles. With respect to the deviation amount of the landing positions of the ink droplets in the nozzle row direction, 0 is an ideal value (deviation amount=0), the deviation amount on one side (for example, the right side) is represented by a positive numerical value, and the deviation amount on the other side (for example, the left side) is represented by a negative numerical value. The detection program of the missing dots is output regarding 100 as one pixel (pix), and the correction data thereof is used for determining whether a nozzle is a nozzle of interest or a defective nozzle by comparison with a threshold set for each color in missing dot correction processing to be described later.

In the present embodiment, since such correction data is prepared for each inkjet module 243, eight pieces of correction data are stored in the storage part 44. In the present embodiment, the correction data is held in accordance with the position. In this manner, the correction data configuring a color is held for each color corresponding to the inkjet module, so that handling of the data is significantly simplified in increasing the print width. On the other hand, in FIG. 6B, in a manner that the correction data is held for each color, as similar to FIG. 6A, pieces of data of a deviation amount of landing positions of the ink droplets are arrayed for the specified number of nozzles from the third column and thereafter, the number being 28416 (3552×8 modules) that is the number of nozzles of all inkjet modules mounted in the head unit 24 in the second row of the first column. Storing in such a format can make pieces of data independent for each color, so handling of data is significantly simplified when the number of colors is increased.

First Embodiment

Figure 7:
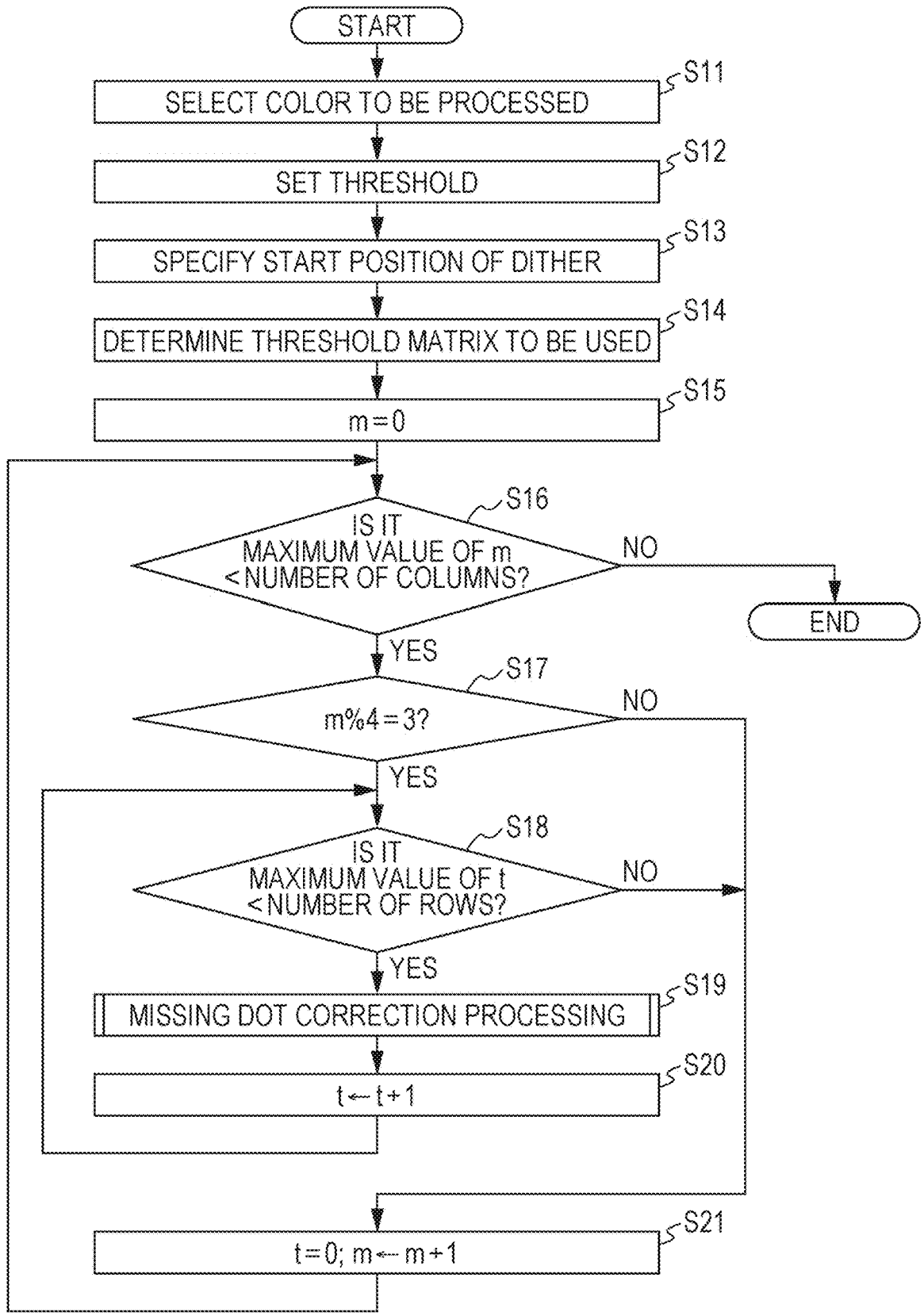
FIG. 7 is a flowchart showing a flow of processing according to a first embodiment (that is, entire processing of correction processing of missing dots)

A first embodiment is an example of overall processing of the missing dot correction processing performed in the missing dot correction part 453 of the image processing function part 45. A flowchart in FIG. 7 shows a flow of processing according to the first embodiment, that is, overall processing performed in the missing dot correction part 453. This processing is performed under the control of the control part 40 (more specifically, the CPU 41) in FIG. 3. This is also similar to the later-described embodiments.

The control part 40 selects the color (Y/M/C/K) to be processed (step S11) and then, sets a threshold for determining whether a nozzle for forming a pixel row of interest is defective nozzle (hereinafter, referred to as "missing dot determination threshold") from the acquired information of the defective nozzle information acquisition part 452 (step S12). Subsequently, the control part 40 specifies the start position of dither (step S13) so as to match (adjust the phases) with the dither pattern that is a previous step of the interpolation of the missing dots, and then determines the threshold matrix (dither matrix) to be used (step S14).

Next, the control part 40 sets the row number m of the quantized data quantized in the halftone processing part as m=0 (step S15), and then determines whether the row number m is smaller than the maximum value of the number of rows of the quantized data (step S16). When the row number m is the maximum value of the number of rows of the threshold matrix (NO in S16), a series of processing for correcting the missing dots is terminated.

When the row number m is smaller than the maximum value of the number of rows of the quantized data (YES in S16), the control part 40 determines whether, for example, when the number of rows of the interpolation area of the missing dots is 4 columns, m %4 representing the remainder obtained by dividing m by 4 is 3 (step S17). When m %4=3 is satisfied (YES in S17), the control part 40 determines whether the row number t is smaller than the maximum value of the number of rows of the quantized data (step S18).

In other words, determination is performed on whether accumulation has reached an amount for four lines (four columns) of the interpolation area of the pixel data missing dots, in a buffer by the processing of step S17. If accumulation has reached an amount for four lines (YES in S17), when it is determined that the row number t refers to the region of quantized pixel data (YES in S18), the control part 40 performs missing dot correction processing (step S19). Details of the missing dot correction processing will be described later.

After the missing dot correction processing, the control part 40 sets the row number t as t←t+1 (step S20), and thereafter, returns to step S18. When m %4=3 is not satisfied (NO in S17) or when the row number t is the maximum value of the number of rows of the threshold matrix (NO in S18), the control part 40 sets the row number t as t=0, and the row number m as m←m+1, and thereafter, returns to step S16 to perform a series of processing described above.

Figure 8:
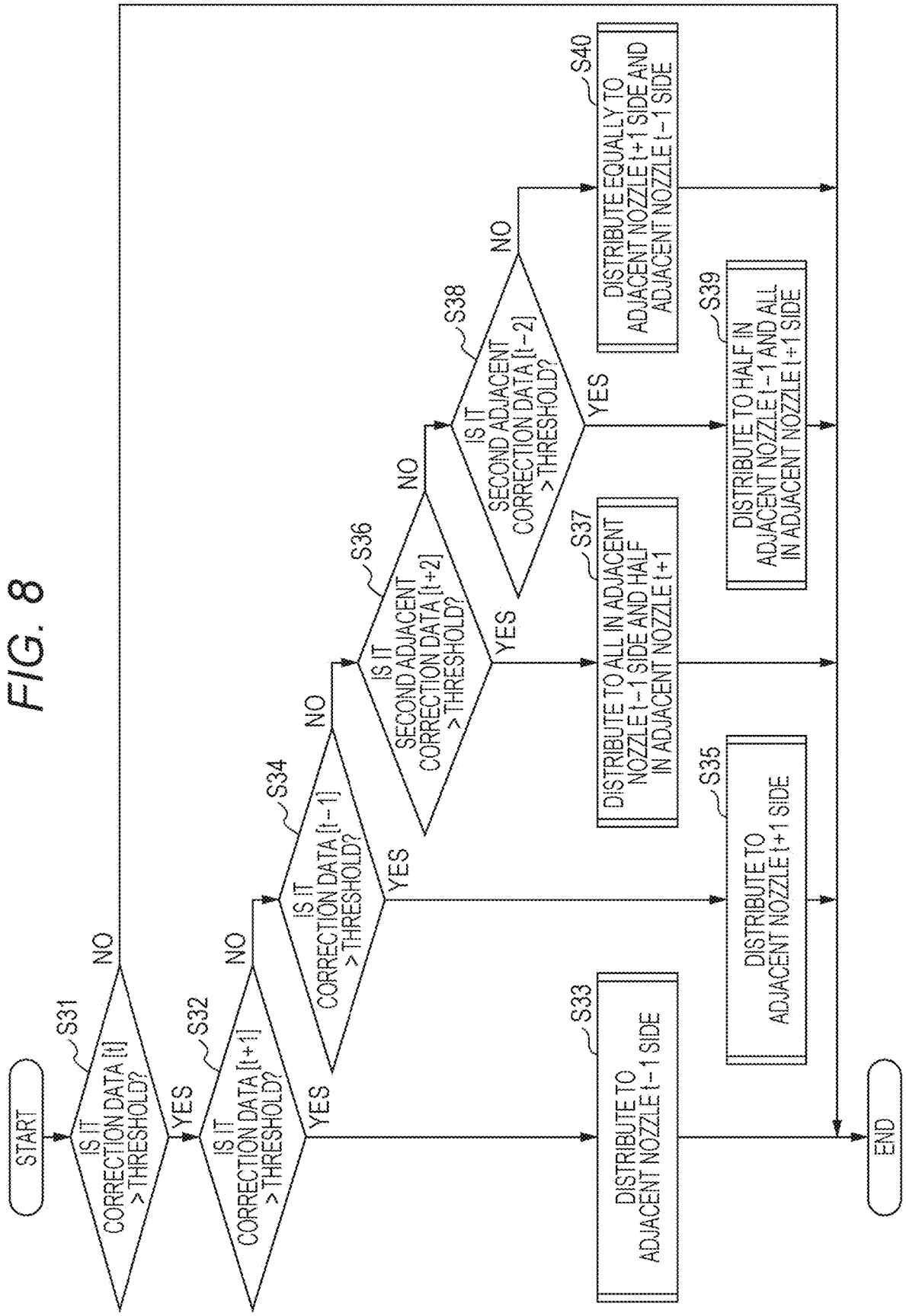
FIG. 8 is a flowchart showing a specific processing flow of correction processing of missing dots.

Next, specific processing of the missing dot correction processing will be described with reference to the flowchart of FIG. 8.

First, when the nozzle number of the nozzles of interest is set to t, the control part 40 determines whether correction data [t] that is the color selected in the correction data held in the storage part 44 and is the landing deviation amount of the corresponding nozzle number t exceeds the missing dot determination threshold (step S31). When the correction data [t] exceeds the missing dot determination threshold (YES in S31), the control part 40 determines whether the correction data [t+1] adjacent to the nozzle row direction positive side of the correction data [t] exceeds the missing dot determination threshold (step S32).

In the determination processing of step S32, when the correction data [t+1] of the nozzle adjacent to the positive side of the nozzle of interest exceeds the missing dot determination threshold (YES of S32), the correction data [t] of the nozzle of interest and the correction data [t+1] of the nozzle adjacent to the positive side of the nozzle of interest are defective nozzles, in other words, nozzles that cannot discharge ink droplets, or nozzles that discharge dots largely deviated from ideal positions.

In this case, the control part 40 sets, the dots formed in the pixel row corresponding to the nozzle of interest t, and the pixel row corresponding to the adjacent nozzle t−1 adjacent to the one direction side of the nozzle row direction in the quantized data to be missing dots, and performs processing of distributing the rearrangement destinations of the missing dots (step S33). Details of the specific processing of step S33 will be described later.

When the correction data [t+1] corresponding to the adjacent nozzle t+1 of one side does not exceed the missing dot determination threshold (NO in S32), the control part 40 determines whether the correction data [t−1] corresponding to the adjacent nozzle t−1 on the other side exceeds the missing dot determination threshold (step S34). In this determination processing, when the correction data [t−1] corresponding to the adjacent nozzle t−1 on the other side exceeds the missing dot determination threshold (YES in S34), the nozzle of interest t and the adjacent nozzle t−1 on the other side are defective nozzles.

In this case, dots formed in successive two pixel rows, that is, a pixel row corresponding to the nozzle of interest tin the quantized data and a pixel row corresponding to the adjacent nozzle t−1 on the other side are regarded as missing dots. The control part 40 performs processing of distributing the rearrangement destinations of the missing dots with respect to the pixel row corresponding to the adjacent nozzle t+1 of one side (step S35). Details of the specific processing of step S35 will be described later.

When the correction data [t−1] corresponding to the adjacent nozzle t−1 on the other side does not exceed the missing dot determination threshold (NO in S34), the control part 40 determines whether the correction data [t+2] corresponding to the nozzle t+2 that is the nozzle next to one nozzle skipped on the one side of the nozzle row direction of the nozzle of interest t exceeds the missing dot determination threshold (step S36). In this determination processing, when the correction data [t+2] corresponding to the nozzle t+2 that is the nozzle next to one nozzle skipped in the one side exceeds the missing dot determination threshold (YES in S36), the nozzle of interest t and the nozzle t+2 that is the nozzle next to one nozzle skipped in the one side are defective nozzles.

In this case, the dot formed in two pixel rows with another row therebetween, that is, the pixel row corresponding to the nozzle of interest tin the quantized data and the pixel row corresponding to the nozzle t+2 that is the nozzle the nozzle next to one nozzle skipped on the one side are regarded as missing dots, and the control part 40 distributes the rearrangement destinations of the missing dots with respect to all pixels in the pixel row of the adjacent nozzle t−1 on the other side and half of the pixels of the pixel row corresponding to the adjacent nozzle t+1 on the one side (step S37). Details of the specific processing of step S37 will be described later.

When the correction data [t+2] corresponding to the nozzle t+2 that is the nozzle next to one nozzle skipped on the one side does not exceed the missing dot determination threshold (NO in S36), the control part 40 determines whether the correction data [t−2] corresponding to the nozzle t−2 that is the nozzle next to one nozzle skipped on the other side of the nozzle row direction of the nozzle of interest t exceeds the missing dot determination threshold (step S38). In this determination processing, when the correction data [t−2] corresponding to the nozzle t−2 that is the nozzle next to one nozzle skipped on the other side exceeds the missing dot determination threshold (YES in S38), the nozzle of interest t and the nozzle t−2 that is the nozzle next to one nozzle skipped on the other side are defective nozzles.

In this case, the dot formed in two pixel rows with one pixel row skipped therebetween, that is, the pixel row corresponding to the nozzle of interest t and the pixel row corresponding to the nozzle t−2 that is the nozzle next to one nozzle skipped on the other side are regarded as missing dots, and the control part 40 performs processing of distributing the rearrangement destinations of the missing dots with respect to all pixels in the pixel row of the adjacent nozzle t+1 on the one side and half of the pixels of the pixel row corresponding to the adjacent nozzle t−1 on the other side (step S39). Details of the specific processing of step S39 will be described later.

In this determination processing of step S38, when the correction data [t−2] corresponding to the nozzle t−2 that is the nozzle next to one nozzle skipped on the other side does not exceed the missing dot determination threshold (NO in S38), one nozzle of interest t is a defective nozzle. In this case, dots formed in the pixel row corresponding to the nozzle of interest t are regarded as missing dots. The control part 40 performs processing of distributing the rearrangement destinations of the missing dots equally to two pixel rows corresponding to the two nozzles t+1, t−1 both adjacent to the nozzle of interest [t] (step S40). Details of the specific processing of step S40 will be described later.

As described above, in the missing dot correction processing, the rearrangement destinations of the missing dots are switched depending on whether the nozzle of interest and the nozzles in the periphery of thereof are defective nozzles.

(1) In dot missing in successive two pixels, there are two kinds of dots missing of a. dot missing in successive pixel rows, that is, a pixel row corresponding to the nozzle of interest t and a pixel row corresponding to the adjacent nozzle t+1 on the one side of the nozzle row direction, and b. dot missing in successive pixel rows, that is, a pixel row corresponding to the nozzle of interest t and a pixel row corresponding to the adjacent nozzle t−1 on the other side of the nozzle row direction.

(2) In dot missing in two pixels with one pixel skipped therebetween, there are two kinds of dots missing of a. dot missing in two pixels with one pixel skipped therebetween, that is, a pixel corresponding to the nozzle of interest t and a pixel corresponding to the nozzle t+2 that is the nozzle next to one nozzle skipped on the one side of the nozzle row direction, and b. dot missing in two pixels with one pixel skipped therebetween, that is, a pixel corresponding to the nozzle of interest t and a pixel corresponding to the nozzle t−2 that is the nozzle next to one nozzle skipped on the other side of the nozzle row direction.

When the pixel row v corresponding to the nozzle of interest t is set as v=0, the control part 40 performs the control of switching the rearrangement destinations of the missing dots as below. In the following description, the pixel row (v=0) corresponding to the nozzle of interest t is referred to as a pixel row of interest (v=0). Also, one side of the nozzle row direction is simply described as "one side", and the other side in the nozzle row direction is simply referred to as "the other side".

(1) Distribution processing of rearrangement destinations of the missing dots in the case of dot missing in two consecutive pixels will be described with reference to FIG. 9A and FIG. 9B. Here, the pixel row of the row number (t=3) is regarded as the pixel row of interest (v=0).

a. Dot missing in successive two pixels, that is, a pixel corresponding to the nozzle of interest t and a pixel corresponding to the adjacent nozzle t+1 on the one side In this case, as shown in FIG. 9A, the pixel row of interest (v=0) and the adjacent pixel row (v=+1) on one side are pixel rows where missing of dot is generated, and the adjacent pixel row (v=+1) on the one side cannot be set as the rearrangement destinations of the missing dots of the pixel row of interest (v=0). Therefore, the pixels of the adjacent pixel row (v=−1) on the other side where missing of dots is not generated, that is, the pixels of the pixel row of the pixel row number (t=2) are set as the rearrangement destinations of the missing dots of the pixel row of interest (v=0). Details of the processing will be described as a second embodiment to be described later.

b. Dot missing in successive two pixels, that is, a pixel corresponding to the nozzle of interest t and a pixel corresponding to the adjacent nozzle t−1 on the other side In this case, as shown in FIG. 9B, the pixel row of interest (v=0) and the adjacent pixel row (v=−1) on the other side become pixel rows where missing dots are generated and the adjacent pixel row (v=−1) cannot be set as the rearrangement destinations of the missing dots of the pixel row of interest (v=0). Therefore, the pixels of the adjacent pixel row (v=+1) on the one side where dot missing is not generated, that is, the pixel row of the row number (t=4), are set as the rearrangement destinations of the missing dots of the pixel row of interest (v=0). Details of the processing will be described as a third embodiment to be described later.

(2) Distribution processing of the rearrangement destinations of the missing dots in the case of dot missing in two pixels with one pixel skipped therebetween will be described with reference to FIG. 10A and FIG. 10B. Also here, the pixel row of the row number (t=3) is regarded as the pixel row of interest (v=0).

a. Dot missing in two pixels with one pixel skipped therebetween, that is, a pixel corresponding to the nozzle of interest t and a pixel corresponding to the nozzle t+2 that is the nozzle next to one nozzle skipped on the one side In this case, as shown in FIG. 10A, a pixel row of interest (v=0) and a pixel row (v=+2) that is the pixel row next to one pixel row skipped on the one side are pixel rows where missing dots are generated. As a result, the pixels of the pixel row (v=+1) between the pixel row (v=0) and the pixel row (v=+2), that is, the pixel row of the row number (t=4) are shared by the pixel row (v=0) and the pixel row (v=+2) as the rearrangement destinations of the missing dots. At this time, it is preferable that the pixel row (v=0) and the pixel row (v=+2) share half each. Specifically, in the case of the dot missing (a) in two pixel rows with one pixel skipped therebetween, as the rearrangement destinations of the missing dots of the pixel row of interest (v=0), half of the pixels of the adjustment pixel row (v=−1) on the other side, and the pixels of the adjacent pixel row (v=+1) on the one side are set. Details of the processing will be described as a sixth embodiment to be described later.

b. Dot missing in two pixels with one pixel skipped therebetween, that is, a pixel corresponding to the nozzle of interest t and a pixel corresponding to the nozzle t−2 that is the nozzle next to one nozzle skipped on the other side In this case, as shown in FIG. 10B, a pixel row of interest (v=0) and a pixel row (v=−2) that is the pixel row next to one pixel row skipped on the other side are pixel rows where missing dots are generated. As a result, the pixels of the pixel row (v=−1) between the pixel row (v=0) and the pixel row (v=−2), that is, the pixel row of the row number (t=2) are shared by the pixel row (v=0) and the pixel row (v=−2) as the rearrangement destinations of the missing dots. At this time, it is preferable that the pixel row (v=0) and the pixel row (v=−2) share half each. Specifically, in the case of the dot missing (b) in two pixels with one pixel skipped therebetween, as the rearrangement destinations of the missing dots of the pixel row of interest (v=0), half of the pixels of the adjustment pixel row (v=+1) on the one side, and the pixels of the adjacent pixel row (v=−1) on the other side are set. Details of the processing will be described as a seventh embodiment to be described later.

In this way, in the case of dot missing (2) in two pixels with one pixel skipped therebetween, the pixels in the pixel row (v=+1), (v=−1) between the pixel row of interest (v=0) and the pixel rows (v=+2), (v=−2) that is the pixel next to one pixel skipped are shared as the rearrangement destinations of the missing dots of two pixel rows of the missing dots. This is because the pixels in the pixel row (v=+1) become the rearrangement destinations of the missing dots of the pixel row of interest (v=0) and the pixel row on the one side (v=+2), and the pixels in the pixel row (v=−1) become the rearrangement destinations of the missing dots of the pixel row of interest (v=0) and the pixel row on the other side (v=−2).

Specifically, in the case (a) of dot missing in the pixel row of interest (v=0) and the pixel row (v=+2) that is next to one pixel row skipped on the one side, the pixels of the pixel row (v=+1) between these pixel rows (v=0), (v=+2) are shared by half each as the rearrangement destinations of the missing dots in the both adjacent pixel rows (v=0), (v=+2). In the case (b) of dot missing of the pixel of interest [t] and the pixel row (v=−2) that is next to one pixel row skipped on the other side, the pixels in the pixel row (v=−1) between these pixel rows (v=0), (v=−2) are shared by half each as the rearrangement destinations of the missing dots in the both adjacent pixel rows (v=0), (v=−2).

(3) In the case of missing of dots in one pixel

Each pixel in the two adjacent pixel rows both adjacent to the pixel row of interest (v=0), that is, the pixels in each of the pixels in the adjacent pixel row (v=−1) and the adjacent pixel row (v=+1) are set as the rearrangement destinations of the missing dots of the pixel row of interest (v=0). At this time, it is preferable to equally set each of the pixels in the adjacent pixel row (v=−1) and the adjacent pixel row (v=+1) as the rearrangement destinations of the missing dots. Details of the processing will be described as a ninth embodiment to be described later.

Second Embodiment

A second embodiment is an example of processing of, in the case of dot missing in successive two pixels, and distributing the rearrangement destinations of the missing dots of the pixel row of interest (v=0) to the adjacent pixel row (v=−1) on the other side. This processing is specific processing of step S33 in FIG. 8. The flowchart of FIG. 11 shows a flow of processing according to the second embodiment, that is, processing of distributing rearrangement destinations of the missing dots of the pixel row of interest (v=0) to the adjacent pixel row (v=−1) on the other side.

Figure 9A:
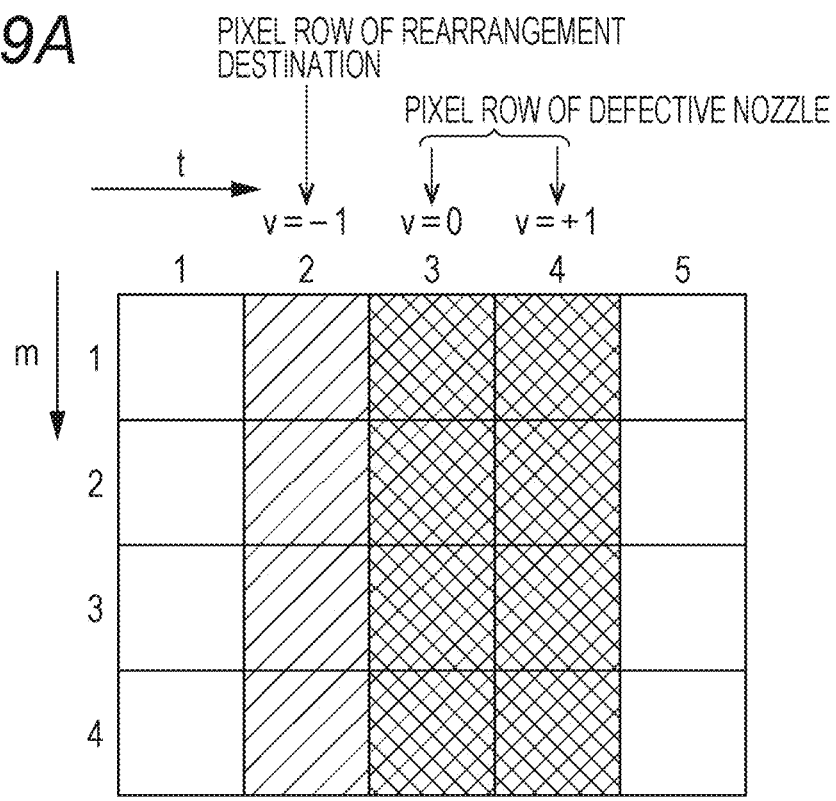
FIG. 9A and FIG. 9B are explanatory diagrams of distribution processing of rearrangement destinations of the missing dots in the case of dot missing in successive two pixels.

In the processing according to the second embodiment, a case will be described as an example in which, as shown in FIG. 9A, a value corresponding to an interpolation area of missing dots in the quantized data subjected to the halftone processing in the halftone processing part 451 is extracted by 5×4 pixels and the pixel row of interest (v=0) and the adjacent pixel row (v=+1) on the one side are regarded as pixel rows of a defective nozzle. Here, the relationship between the row number m of the quantized data and the column number h of the interpolation area of the missing dots described in FIG. 7 can be represented as h=m %4 (remainder obtained by dividing m by 4). This is also similar to the later-described embodiments.

The control part 40 sets the column number h as h=0 (step S41), then determines whether the column number h satisfies h<4 (step S42), and, when h<4 is satisfied (YES in step S42), sets the row number v as v=v−1 (step S43).

Next, the control part 40 determines whether the row number v satisfies v≤1 (step S44), and, when v≤1 is satisfied (YES in S44), determines whether the row number v satisfies v=0 (step S45). Then, in the case of v=0 (YES in S45), the control part 40 counts the number of dots formed in the corresponding pixel row, for the pixel row of interest (v=0) that corresponds to the defective nozzle (step S46), and then sets the row number v as v=v+1 (step S47), and thereafter, the processing returns to step S44. Details of the specific processing of step S46 will be described later.

In the case where the row number v does not satisfy v≤1 (NO in S44), the control part 40 sets the column number h as h=h+1 and the row number v as v=0 (step S48), and thereafter, the processing returns to step S42. When v=0 is not satisfied (NO in S45), the control part 40 determines whether the row number v satisfies v=−1 (step S49).

When v=−1 is satisfied (YES in S49), the control part 40 picks up a pixel (hereinafter referred to as "candidate pixel") having a possibility of rearrangement of the missing dots, from the adjacent pixel row (v=−1) on the other side (step S50), and thereafter, the processing proceeds to step S47. When v=−1 is not satisfied (NO in S49), the control part 40 deletes all the pixels from the movement target of the missing dots with respect to the adjacent pixel row (v=+1) on the one side (step S51), and thereafter, the processing proceeds to step S47. Details of the specific processing of steps S50 and S51 will be described later.

In step S42, when h<4 is not satisfied (NO in S42), the control part 40 rearranges the missing dots, for the pixel row of interest (v=0) (step S52), and thereafter, terminates the series of processing for distributing the rearrangement destinations of the missing dots to the adjacent pixel row (v=−1) on the other side. Details of the specific processing of step S52 will be described later.

As described above, when the rearrangement destinations of the missing dots are distributed, when v=0 (t=3 in the present embodiment) is set as the pixel row of interest, each pixel of the adjacent pixel rows (v=−1), (v=+1) both adjacent to the pixel row of interest (v=0) is set as the rearrangement destination of the missing dot. At that time, in a third embodiment, it is necessary that the rearrangement destinations are close to the adjacent pixel row (v=−1) on the other side. Therefore, when the row number v satisfies v=−1, the pixel is picked up as the candidate pixel (target pixel) of the rearrangement destinations of the missing dots.

Third Embodiment

A third embodiment is an example of processing of, in the case of dot missing in successive two pixels, distributing the rearrangement destinations of the missing dots of the pixel row of interest (v=0) to the adjacent pixel row (v=+1) on the one side. This processing is specific processing of step S35 in FIG. 8. The flowchart of FIG. 12 shows a flow of processing according to the third embodiment, that is, processing of distributing rearrangement destinations of the missing dots of the pixel row of interest (v=0) to the adjacent pixel row (v=+1) on the one side.

Figure 9B:
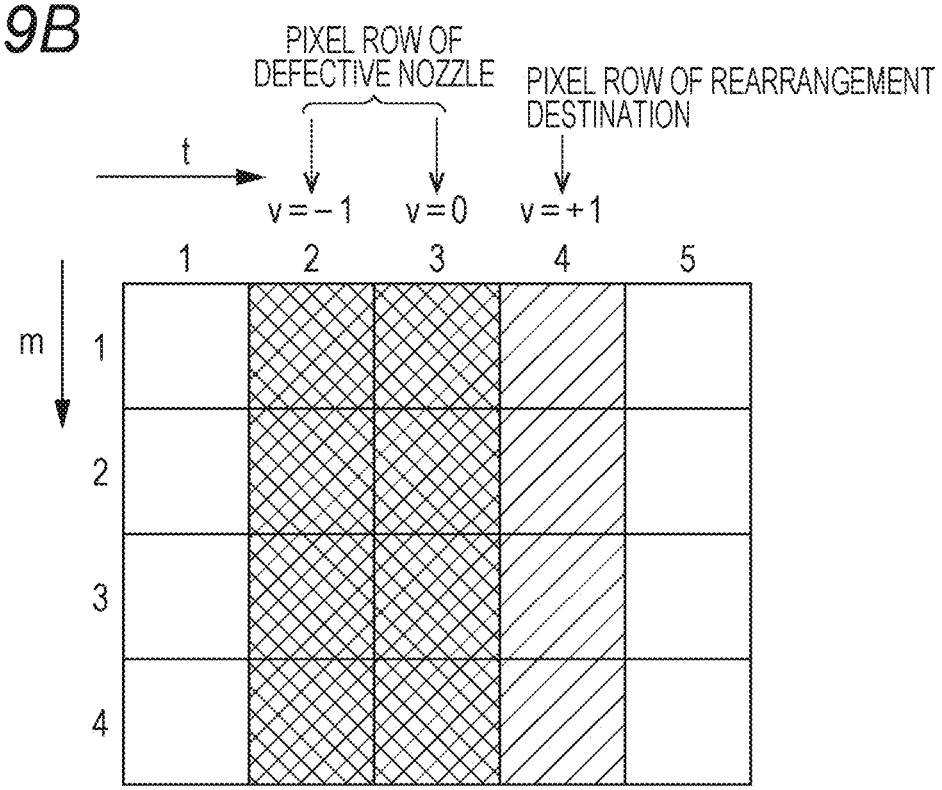

In the processing according to the third embodiment, a case will be described as an example of, as shown in FIG. 9B, extracting a value corresponding to an interpolation area of missing dots in quantized data that has been subjected to the halftone processing in the halftone processing part 451 by 5×4 pixels, and regarding the pixel row of interest (v=0) and the adjacent pixel row (v=−1) on the other side as pixel rows of defective nozzles.

The control part 40 sets the column number h as h=0 (step S61), then determines whether the column number h satisfies h<4 (step S62), and, when h<4 is satisfied (YES in step S62), sets the row number v as v=v−1 (step S63).

Next, the control part 40 determines whether the row number v satisfies v≤1 (step S64), and, when v≤1 is satisfied (YES in S64), determines whether the row number v satisfies v=0 (step S65). Then, when v=0 is satisfied (YES in S65), the control part 40 counts the number of dots to be deleted by the dot missing, for the pixel row of interest (v=0) that corresponds to the defective nozzle (step S66), and then sets the row number v as v=v+1 (step S67), and thereafter, the processing returns to step S64. Details of the specific processing of step S66 will be described later.

When the row number v does not satisfy v≤1 (NO in S64), the control part 40 sets the column number h as h=h+1 and the row number v as v=0 (step S68), and thereafter, the processing returns to step S62. When v=0 is not satisfied (NO in S65), the control part 40 determines whether the row number v satisfies v=−1 (step S69).

When v=−1 is satisfied (YES in S69), the control part 40 deletes all the pixels from the movement target of the missing dots with respect to the adjacent pixel row (v=−1) on the other side (step S70), and thereafter, the processing proceeds to step S67. When v=−1 is not satisfied (NO in S69), the control part 40 picks up candidate pixels of rearrangement destinations of the missing dots from all pixels of the adjacent pixel row (v=+1) on the one side (step S71), and thereafter, the processing proceeds to step S67. Details of the specific processing of steps S70 and S71 will be described later.

In step S62, when h<4 is not satisfied (NO in S62), the control part 40 rearranges the missing dots, for the pixel row of interest (v=0) (step S62), and thereafter, terminates the series of processing for distributing the rearrangement destinations of the missing dots to the adjacent pixel row (v=+1) in the one side. Details of the specific processing of step S72 will be described later.

As described above, when the rearrangement destinations of the missing dots are distributed, when v=0 (t=3 in the present embodiment) is set as the pixel row of interest, each pixel of the adjacent pixel rows (v=−1), (v=+1) both adjacent to the pixel row of interest (v=0) is set as the rearrangement destination of the missing dot. In this case, in a fourth embodiment, it is necessary to bring it toward the adjacent pixel row (v=+1) on the one side. Therefore, when the row number v satisfies v=+1, the pixel is picked up as the candidate pixel of the rearrangement destinations of the missing dots.

Fourth Embodiment

The fourth embodiment is an example of processing of counting the number of dots to be deleted due to dot missing, processing of picking up candidate pixels of the rearrangement destinations of missing dots, and processing of deleting all pixels from movement targets of missing dots.

The processing of counting the number of dots to be deleted due to the dot missing is specific processing of step S46 in FIG. 11 and step S66 in FIG. 12. The processing of picking up candidate pixels of rearrangement destinations of missing dots is specific processing of step S50 in FIG. 11 and step S71 in FIG. 12. The processing of deleting all pixels in the pixel row from movement targets of missing dots is specific processing of step S51 in FIG. 11 and step S70 in FIG. 12.

The flowcharts of FIG. 13A to FIG. 13C show a flow of processing according to the fourth embodiment (that is, processing A for counting the number of missing dots determined not to be formed by a defective nozzle in a pixel row corresponding to the defective nozzle, processing B for picking up candidate pixels of the rearrangement destinations of the missing dots, and processing C of deleting all pixels from movement targets of the missing dots.

In counting the number of missing dots determined not to be formed by the defective nozzle, a dot having a relatively low density per unit area (that is, light in density) is set as a small dot, and a dot having a relatively high density per unit area is (that is, dark in density) is set as a large dot. In the processing of FIG. 13A, that is, in the processing of counting the number of missing dots determined not to be formed by the defective nozzle, the control part 40 counts the number of small dots (step S81), and then counts the number of large dots (step S82). In this way, in the processing of FIG. 13A, for the pixel row of interest (v=0), dots to be deleted due to dot missing are divided into small dots and large dots and counted. At this time, the dot formation information is deleted at the same time as the counting. This is because, it is possible to eject from a nozzle having a large landing deviation amount and determined to be a defective nozzle, although the landing position is largely deviated, and therefore, an unintended increase in density occurs when a dot is formed with a defective nozzle after rearrangement. The dot formation information of the pixel row determined as a defective nozzle is deleted, so that such a problem can be eliminated.

In the processing of FIG. 13B, that is, the processing of picking up candidate pixels of rearrangement destinations of the missing dots determined not to be formed by the defective nozzle, in the halftone processing part 451, reference is made to the value of the threshold matrix of which phase is adjusted spatially with the phase of when the phase is applied at the time of generation of the halftone pattern. This will be described with reference to FIG. 5. The threshold matrix illustrated in FIG. 5 is obtained by picking up pieces of data of five pixels in the t direction and four pixels in the m direction being the interpolation area of the missing dots in the threshold matrix used at the generation of the halftone pattern, and allocating the pieces of data to 1-20 in ascending order of the thresholds composing the data. Also, in this drawing, t=3 satisfies v=0 and m=1 satisfies h=0.

As a rule, the control part 40 holds this threshold together with coordinates so as to make the pixel positions with no dot (blank pixels) easiest to be rearranged. In order to set the pixel positions of the small dots as the candidates of the next rearrangement destinations, a value obtained by adding twenty to the threshold of the corresponding portion is held together with the coordinate, finally, in order to set the pixel positions of the large dots as the candidates of the rearrangement destinations, forty is added to the threshold of the corresponding portion, and the values are stored (step S83). Then, the values are used in the rearrangement processing of the missing dots in step S52 in FIG. 11 and step S72 in FIG. 12. In the processing of FIG. 13C, that is, in the processing of deleting all the pixels from the movement targets of the missing dots, the control part 40 puts a large number of 60 or more in all pixels (step S84).

In this way, in each processing of FIG. 13B and FIG. 13C, preparations for calculating the candidate pixels of the rearrangement destinations are performed. When the halftone processing is performed using a threshold matrix, since dots are arranged from a position with a small threshold, a position having a small value of the threshold matrix to be referred to is the position where a dot is arranged next. As a rule in rearrangement of the missing dots, in order to arrange the missing dots in ascending order of the numerical values (thresholds) stored in each pixel of the threshold matrix (dither matrix), a small numerical value is set to a pixel position where a missing dot is to be rearranged, and a large numerical value is set to a pixel position where a missing dot is not to be rearranged. A multiple of a numerical value larger than the maximum value of the thresholds composing the interpolation area of the missing dots is added separately for pixel positions with no dot, small dot pixel positions, and rearrangement forbidden pixel positions, so that the order of interpolation of the missing dots can be controlled.

Fifth Embodiment

Figure 14:
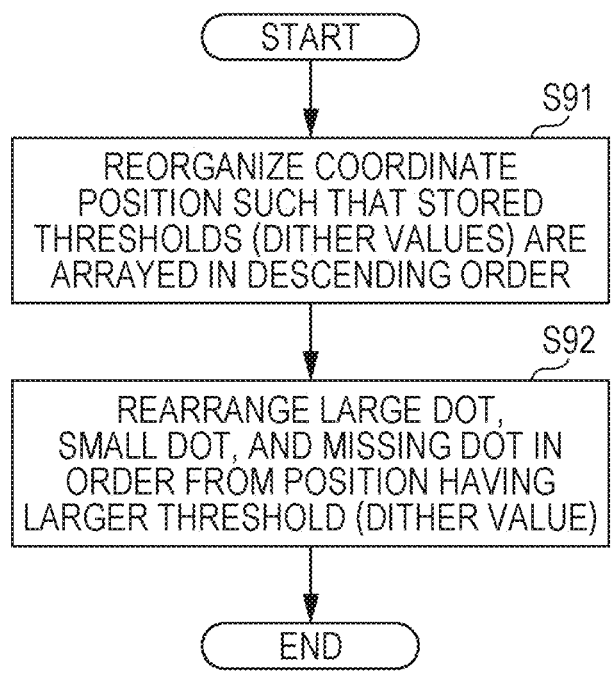
FIG. 14 is a flowchart showing a flow of processing according to a fifth embodiment (that is, processing of rearranging missing dots)

A fifth embodiment is an example of processing of rearranging missing dots. This processing is specific processing of step S52 in FIG. 11 and step S72 in FIG. 12. In this rearrangement processing of missing dots, the threshold (dither value) picked up and stored in the processing of FIG. 13B, that is, the processing of picking up of the candidate pixels of the rearrangement destinations of the missing dots is used. The flowchart of FIG. 14 shows a flow of processing according to the fifth embodiment, that is, processing of rearranging missing dots.

The control part 40 reorganizes the coordinate positions of the pixels so that the thresholds (dither values) stored in the processing of FIG. 13B are arrayed in descending order, to create a table (step S91). Next, the control part 40 rearranges the missing dots in the descending order of the degree of visual influence, that is, the large dots, the small dots, and so on in order from the pixel position having a larger threshold, on the basis of the created table (step S12).

Here, rearranging in order from a pixel position having a larger threshold means rearranging a large dot that may increase the density, to a portion where a gap is large. Therefore, as described above, by rearranging missing dots in descending order of the degree of visual influence, it is possible to make the density distribution of the image formed on the recording medium uniform throughout. Here, the term "uniform" includes not only a case of being strictly uniform but also a case of being substantially uniform, and existence of variations caused by various factors is allowed.

Sixth Embodiment

Figure 15:
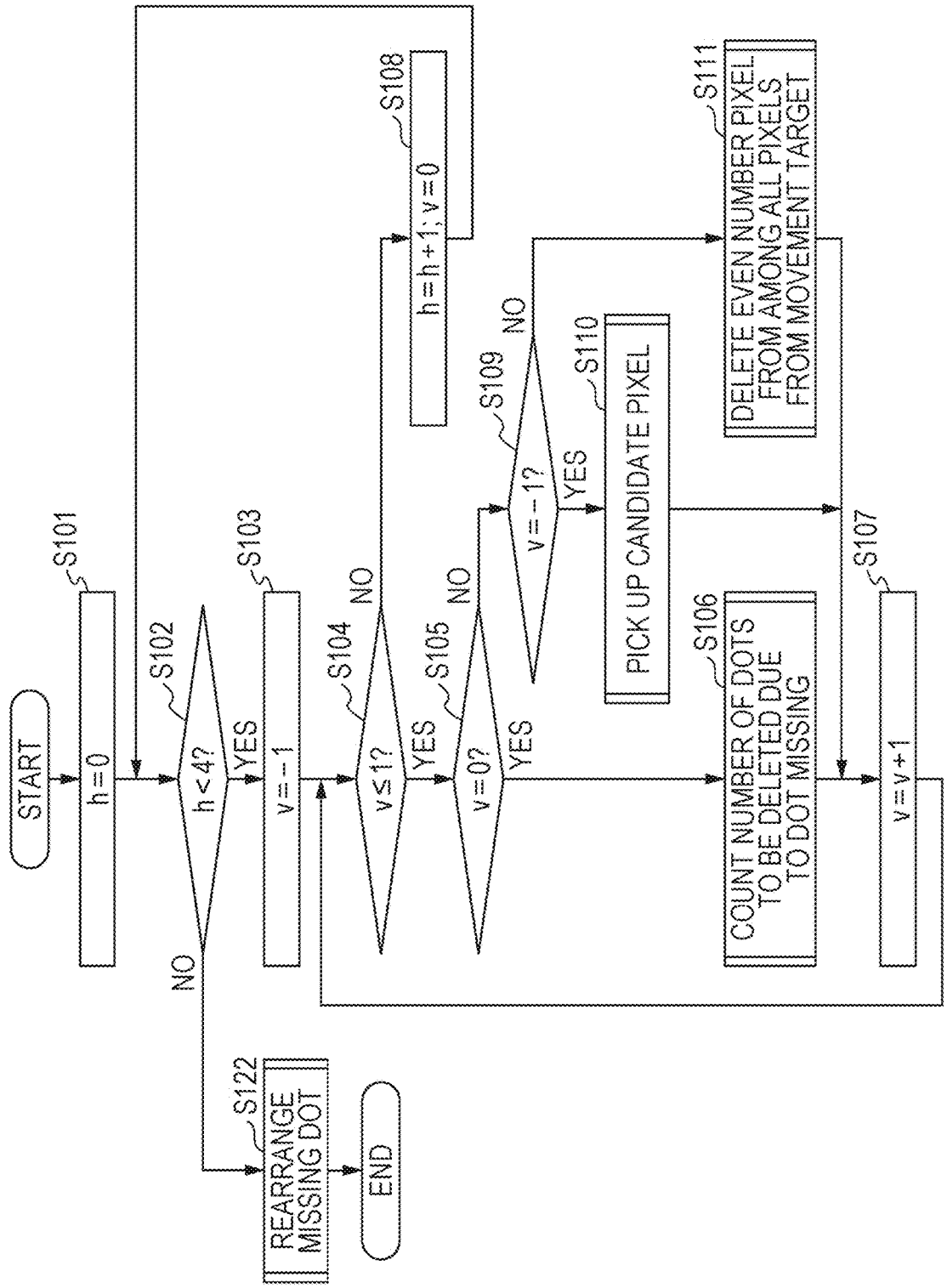
FIG. 15 is a flowchart showing a flow of processing according to a sixth embodiment (that is, processing of distributing the rearrangement destinations of missing dots to all pixels in an adjacent pixel row in the other side and a half of pixels in an adjacent pixel row in one side of the pixel row of interest in the case of dot missing in two pixels with one pixel skipped therebetween)

A sixth embodiment is an example of processing, in the case of the dot missing in two pixels with one pixel skipped therebetween, the rearrangement destinations of the missing dots of the pixel row of interest (v=0) are distributed to all pixels of the adjustment pixel row (v=−1) on the other side, and a half of the pixels of the adjacent pixel row (v=+1) on the one side. This processing is specific processing of step S37 in FIG. 8. The flowchart of FIG. 15 shows a flow of processing according to the sixth embodiment, that is, processing of distributing rearrangement destinations of the missing dots of all pixels of the adjustment pixel row (v=−1) on the other side, and a half of the pixels of the adjacent pixel row (v=+1) on the one side.

Figure 10A:
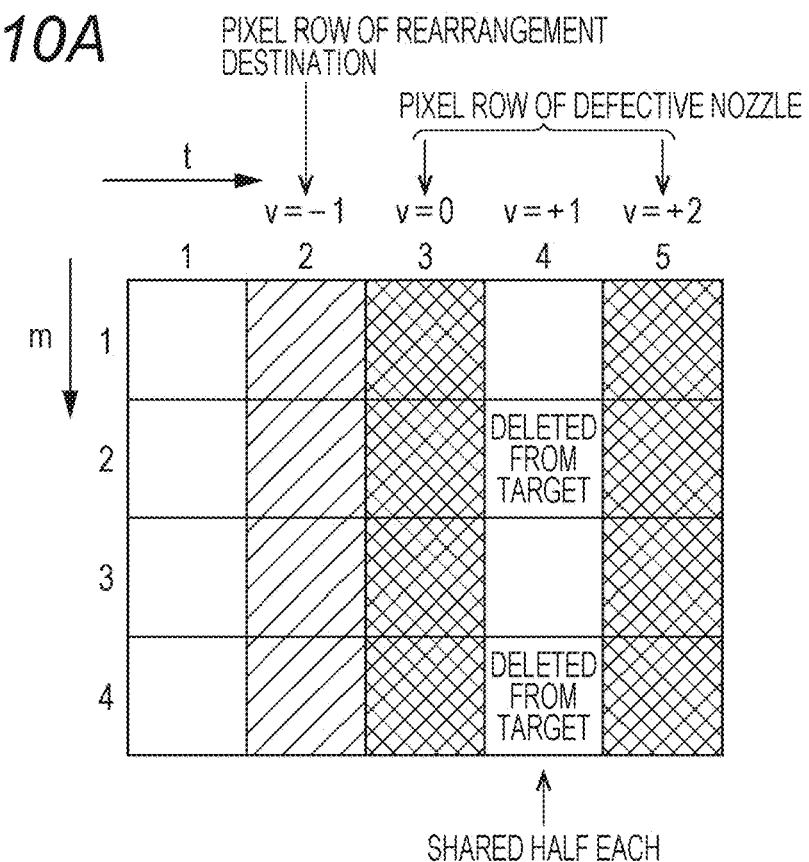
FIG. 10A and FIG. 10B are explanatory diagrams of distribution processing of the rearrangement destinations of the missing dots in the case of dot missing in two pixels with one pixel skipped therebetween.

In the processing according to the sixth embodiment, a case will be described as an example in which, as shown in FIG. 10A, a value corresponding to an interpolation area of missing dots in quantized data subjected to the halftone processing in the halftone processing part 451 is extracted by 5×4 pixels and the pixel row of interest (v=0) and the pixel row (v=+2) that is the pixel row next to one pixel row skipped on the one side are regarded as pixel rows of a defective nozzle.

The control part 40 sets the column number h as h=0 (step S101), then determines whether the column number h satisfies h<4 (step S102), and, when h<4 is satisfied (YES in step S102), sets the row number v as v=v−1 (step S103).

Next, the control part 40 determines whether the row number v satisfies v≤1 (step S104), and, when v≤1 is satisfied (YES in S104), determines whether the row number v satisfies v=0 or not (step S105). When v=0 is satisfied (YES in S105), the control part 40 counts the number of dots formed in the corresponding pixel row, for the pixel row of interest (v=0) that corresponds to the defective nozzle (step S106), then sets the row number v as v=v+1 (step S107), and thereafter, the processing returns to step S104.

When the row number v does not satisfy v≤1 (NO in S104), the control part 40 sets the column number h as h=h+1 and the row number v as v=0 (step S108), and thereafter, the processing returns to step S102. When v=0 is not satisfied (NO in S105), the control part 40 determines whether the row number v satisfies v=−1 (step S109).

When v=−1 is satisfied (YES in S109), the control part 40 picks up candidate pixels of rearrangement destinations of missing dots from all pixels of the adjacent pixel row (v=−1) on the other side (step S110), and thereafter, the processing proceeds to step S107. When v=−1 is not satisfied (NO in S109), the control part 40 deletes, for example, pixels of even number out of all pixels of the adjacent pixel row (v=+1) on the one side, from the movement targets of the missing dots (step S111), and thereafter, the processing proceeds to step S107.

In step S102, when h<4 is not satisfied (NO in S102), the control part 40 rearranges the missing dots (step S112), and thereafter, terminates the series of processing for distributing the rearrangement destinations of the missing dots to all pixels of the adjacent pixel row (v=−1) on the other side, and a half of pixels of the adjacent pixel row (v=+1) on the one side.

Seventh Embodiment

Figure 16:
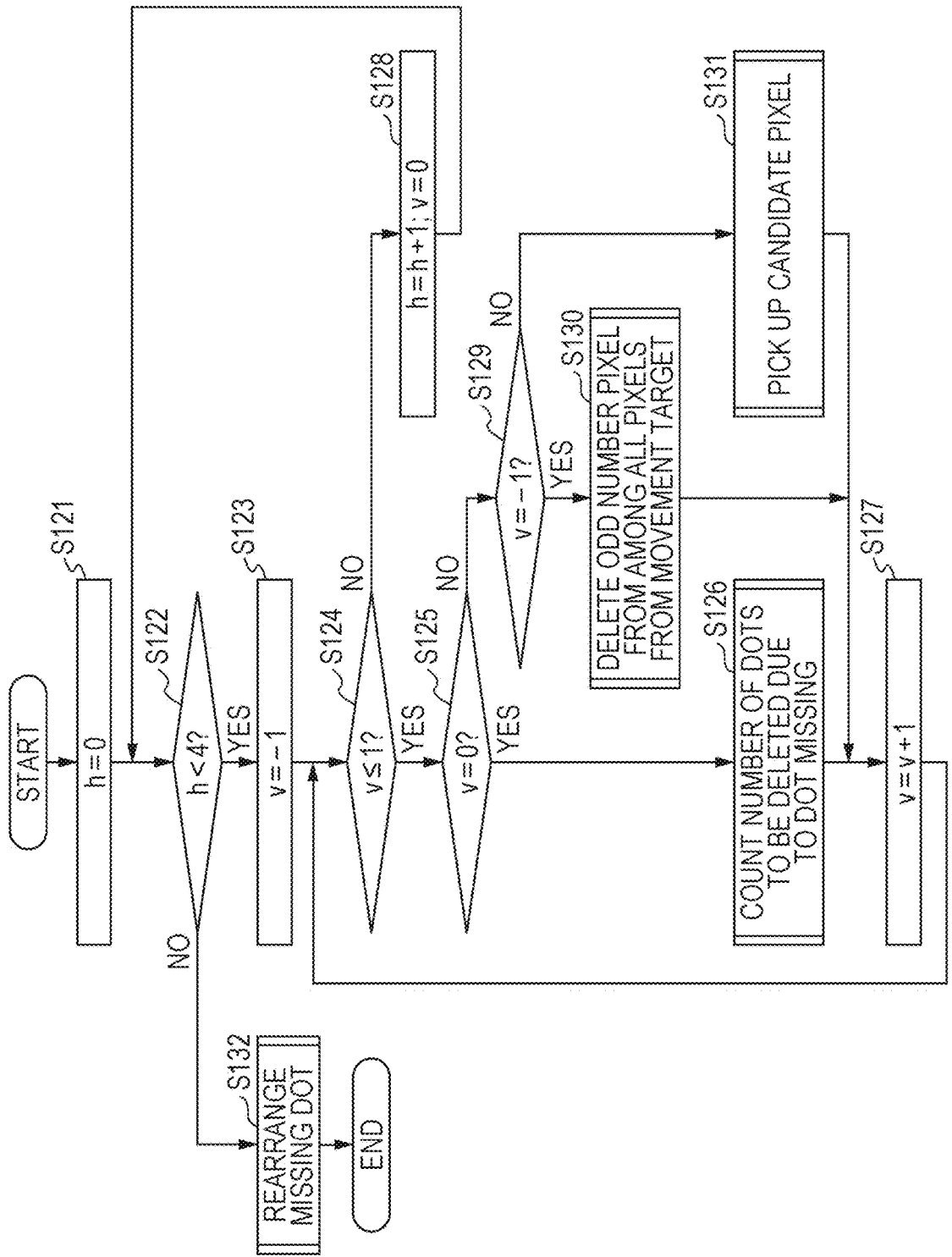
FIG. 16 is a flowchart showing a flow of processing according to a seventh embodiment (that is, processing of distributing the rearrangement destinations of missing dots to all pixels in an adjacent pixel row in one side and a half of pixels in an adjacent pixel row in the other side of the pixel row of interest in the case of dot missing in two pixels with one pixel skipped therebetween)

A seventh embodiment is an example of processing, in the case of the dot missing in two pixels with one pixel skipped therebetween, the rearrangement destinations of the missing dots of the pixel row of interest (v=0) are distributed to all pixels of the adjustment pixel row (v=+1) on the one side, and a half of the pixels of the adjacent pixel row (v=−1) on the other side. This processing is specific processing of step S39 in FIG. 8. The flowchart of FIG. 16 shows a flow of processing according to the seventh embodiment, that is, processing of distributing rearrangement destinations of the missing dots to all pixels of the adjacent pixel row (v=+1) on the one side, and a half of the pixels of the adjacent pixel row (v=−1) on the other side.

Figure 10B:
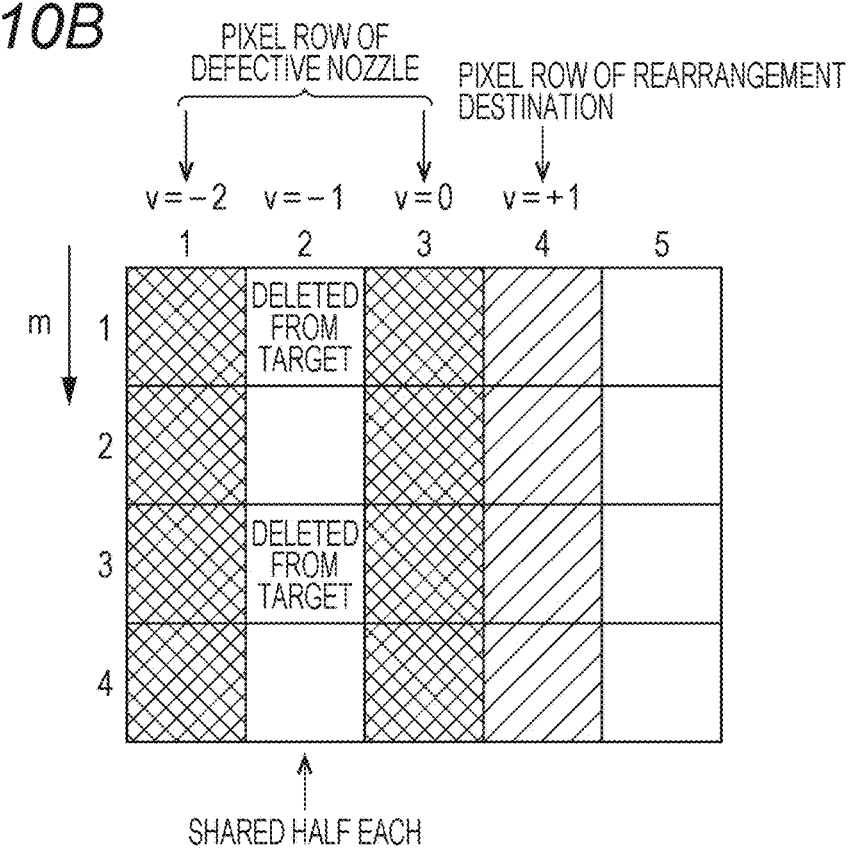

In the processing according to the seventh embodiment, a case will be described as an example in which, as shown in FIG. 10B, a value corresponding to an interpolation area of missing dots in quantized data subjected to the halftone processing in the halftone processing part 451 is extracted by 5×4 pixels and the pixel row of interest (v=0) and the pixel row (v=−2) that is the pixel row next to one pixel row skipped on the other side are regarded as pixel rows of the missing dots (defective nozzles).

The control part 40 sets the column number h as h=0 (step S121), then determines whether the column number h of the pixel of interest [t] satisfies h<4 (step S122), and, when h<4 is satisfied (YES in step S122), sets the row number v as v=v−1 (step S123).

Next, the control part 40 determines whether the row number v satisfies v≤1 (step S124), and, when v≤1 is satisfied (YES in S124), determines whether the row number v is v=0 (step S125). Then, when v=0 is satisfied (YES in S125), the control part 40 counts the number of dots formed in the corresponding pixel row, for the pixel row of interest (v=0) that corresponds to the defective nozzle (step S126), then sets the row number v as v=v+1 (step S127), and thereafter, the processing returns to step S124.

When the row number v does not satisfy v≤1 (NO in S124), the control part 40 sets the column number has h=h+1 and the row number v as v=0 (step S128), and thereafter the processing returns to step S122. When v=0 is not satisfied (NO in S125), the control part 40 determines whether the row number v satisfies v=−1 (step S129).

When v=−1 is satisfied (YES in S129), the control part 40 deletes, for example, pixels of odd number out of all pixels of the adjacent pixel row (v=−1) on the other side, from the movement targets of the missing dots (step S130), and thereafter, the processing proceeds to step S127. When v=−1 is not satisfied (NO in S129), the control part 40 picks up candidate pixels of rearrangement destinations of the missing dots from all pixels of the adjacent pixel row (v=+1) on the one side (step S131), and thereafter, the processing proceeds to step S127.

In step S122, when h<4 is not satisfied (NO in S122), the control part 40 rearranges the missing dots (step S132), and thereafter, terminates the series of processing for distributing the rearrangement destinations of the missing dots to all pixels of the adjacent pixel row (v=+1) on the one side, and a half of pixels of the adjacent pixel row (v=−1) on the other side.

Eighth Embodiment

The eighth embodiment is an example of processing, in the case of the dot missing in one pixel (one pixel row), the rearrangement destinations of the missing dots of the pixel row of interest (v=0) are distributed equally to both adjacent pixel rows (v=+1), (v=−1) of the pixel row of interest (v=0). This processing is specific processing of step S40 in FIG. 8. The flowchart of FIG. 17 shows a flow of processing according to the eighth embodiment, that is, processing of distributing rearrangement destinations of the missing dots equally to each pixel row of the adjacent pixels [t+1], [t−1].

The control part 40 sets the column number h as h=0 (step S141), then determines whether the column number h satisfies h<4 (step S142), and, when h<4 (YES in step S142), sets the row number v as v=v−1 (step S143).

Next, the control part 40 determines whether the row number v satisfies v≤1 (step S144), and, when v≤1 is satisfied (YES in S144), determines whether the row number v satisfies v=0 (step S145). Then, when v=0 is satisfied (YES in S145), the control part 40 counts the number of dots formed in the corresponding pixel row, for the pixel row of interest (v=0) that corresponds to the defective nozzle (step S146), then sets the row number v as v=v+1 (step S147), and thereafter, the processing returns to step S144.

When the row number v does not satisfy v≤1 (NO in S144), the control part 40 sets the column number h as h=h+1 and the row number v as v=0 (step S148), and thereafter, the processing returns to step S142. When v=0 is not satisfied (NO in S145), the control part 40 determines whether the row number v satisfies v=−1 (step S149).

When v=−1 is satisfied (YES in S149), the control part 40 picks up candidate pixels of rearrangement destinations of the missing dots from all pixels of the adjacent pixel row (v=−1) on the other side (step S150), and thereafter, the processing proceeds to step S147. When v=−1 is not satisfied (NO in S149), the control part 40 picks up candidate pixels of rearrangement destinations of the missing dots from all pixels of the adjacent pixel row (v=+1) on the one side (step S151), and thereafter, the processing proceeds to step S147.

In step S142, when h<4 is not satisfied (NO in S142), the control part 40 rearranges the missing dots (step S152), and thereafter, terminates the series of processing for distributing the rearrangement destinations of the missing dots equally to both adjacent pixel rows (v=+1), (v=−1) of the pixel row of interest (v=0).

As described above, in the eighth embodiment, in the case of the dot missing in one pixel (one pixel row), the pixels of both adjacent pixel rows (v=+1), (v=−1) of the pixel row of interest (v=0) are equally set as the rearrangement destinations of the missing dots. Specifically, in both cases of the adjacent pixel row (v=+1) on the one side and the adjacent pixel row (v=−1) on the other side, pixels having a possibility of rearrangement of missing dots are picked up as the candidate pixels.

MODIFICATION

Although embodiments of the present invention have been described and illustrated in detail, the disclosed embodiments are made for purposes of illustration and example only and not limitation. The scope of the present invention should be interpreted by terms of the appended claims. That is, various modifications or improvements can be added to the above embodiments within the scope not deviating from the gist of the present invention, and a mode added with such modification or improvement is also included in the technical scope of the present invention.

For example, in the above embodiments, an example in which a sheet is used as a recording medium has been described. However, the present invention is not limited to this example. For example, as the recording medium, various recording media such as cloth, plastic film, or glass plate can be used.

In the above embodiments, the drum type inkjet recording device using the image forming drum 21 for conveying the recording medium has been described as an example. However, the present invention is not limited to this, and the present invention can be applied to a belt type inkjet recording device using an endless conveyor belt.

What is claimed is:

1. An image forming device comprising:
    a hardware processor that performs halftone processing on input image data using a threshold matrix of a dither method, and that, when dot missing exists in a formed image by an image forming part of the image forming device, performs interpolation by rearranging a missing dot to peripheral pixel position; and
    the image forming part that forms an image on a recording medium on the basis of image data after halftone processing by a halftone processing part of the hardware processor, wherein
    the hardware processor is configured to set, as a rearrangement destination of the missing dot, a pixel of a threshold closest to a threshold for which an image is formed among pixels of thresholds for which images are not formed.

2. The image forming device according to claim 1, wherein
    the image forming part causes a plurality of nozzles to discharge droplets of ink and land the droplets on the recording medium to form an image.

3. The image forming device according to claim 2, wherein
    the missing dot is generated due to a defective nozzle that cannot discharge the droplets of ink and a defective nozzle of which a landing position of the droplets of ink on the recording medium deviates.

4. The image forming device according to claim 2, wherein
    the ink is UV curable ink or phase change ink.

5. The image forming device according to claim 3, wherein
    the hardware processor acquires information on the defective nozzle, and
    the hardware processor performs interpolation processing of the missing dot on the basis of information acquired by the hardware processor.

6. The image forming device according to claim 1, wherein
    the hardware processor, in a dot of a pixel row of a pixel of interest and a peripheral pixel row, switches the rearrangement destination of the missing dot in accordance with each state of dot missing in successive two pixels, dot missing in two pixels with one pixel skipped therebetween, and dot missing in one pixel.

7. The image forming device according to claim 6, wherein
    in a dot missing state in successive two pixels, the hardware processor sets a pixel in an adjacent pixel row on a side in which dot missing is not generated, out of two adjacent pixel rows both adjacent to the a pixel row of the pixel of interest, as the rearrangement destination of the missing dot.

8. The image forming device according to claim 6, wherein
    in a dot missing state in two pixels with one pixel skipped therebetween, the hardware processor shares a pixel in a pixel row between pixel rows of the two pixels as the rearrangement destination of the missing dot of the two pixel rows.

9. The image forming device according to claim 6, wherein in a dot missing state in one pixel, the hardware processor sets each pixel in two adjacent pixel rows both adjacent to the pixel row of the pixel of interest as the rearrangement destination of the missing dot.

10. An image processing device comprising:

a hardware processor that performs halftone processing on input image data using a threshold matrix of a dither method, and that, when dot missing exists in an image formed on a recording medium on the basis of image data after halftone processing by the hardware processor, performs interpolation by rearranging the missing dot in a peripheral pixel position, wherein the hardware processor is configured to set, as a rearrangement destination of the missing dot, a pixel of a threshold closest to a threshold for which an image is formed among pixels of thresholds for which images are not formed.

11. An image processing method comprising:

performing halftone processing on input image data using a threshold matrix of a dither method; and when dot missing exists in an image formed on a recording medium on the basis of image data after halftone processing, performing interpolation by rearranging the missing dot in a peripheral pixel position, wherein setting, as a rearrangement destination of the missing dot, using the threshold matrix, a blank pixel in an adjacent pixel row to the missing dot a pixel of a threshold closest to a threshold for which an image is formed among pixels of thresholds for which images are not formed.

* * * * *